United States Patent
Wang et al.

(10) Patent No.: US 12,218,763 B2
(45) Date of Patent: Feb. 4, 2025

(54) METHODS AND APPARATUS FOR HARQ IN WIRELESS NETWORKS

(71) Applicant: InterDigital Patent Holdings, Inc., Wilmington, DE (US)

(72) Inventors: Xiaofei Wang, Cedar Grove, NJ (US); Oghenekome Oteri, San Diego, CA (US); Hanqing Lou, Syosset, NY (US); Li Hsiang Sun, San Diego, CA (US); Joseph Levy, Merrick, NY (US); Alphan Sahin, Westbury, NY (US); Frank LaSita, Setauket, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 164 days.

(21) Appl. No.: 17/292,268

(22) PCT Filed: Nov. 1, 2019

(86) PCT No.: PCT/US2019/059375
§ 371 (c)(1),
(2) Date: May 7, 2021

(87) PCT Pub. No.: WO2020/096895
PCT Pub. Date: May 14, 2020

(65) Prior Publication Data
US 2021/0409165 A1    Dec. 30, 2021

Related U.S. Application Data

(60) Provisional application No. 62/757,555, filed on Nov. 8, 2018.

(51) Int. Cl.
*H04L 1/1607* (2023.01)
*H04L 1/1812* (2023.01)
*H04L 1/1867* (2023.01)

(52) U.S. Cl.
CPC .......... *H04L 1/1819* (2013.01); *H04L 1/1614* (2013.01); *H04L 1/1896* (2013.01)

(58) Field of Classification Search
None
See application file for complete search history.

(56) References Cited

U.S. PATENT DOCUMENTS

| | | |
|---|---|---|
| 9,876,614 B1 | 1/2018 | Sun et al. |
| 2008/0186886 A1 | 8/2008 | Cho et al. |

(Continued)

FOREIGN PATENT DOCUMENTS

| | | |
|---|---|---|
| CN | 104285400 A | 1/2015 |
| CN | 105634704 A | 6/2016 |

(Continued)

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands pelow 6GHZ, IEEE P802.11ac/D1.0 (May 2011).

(Continued)

*Primary Examiner* — Benjamin Lamont
(74) *Attorney, Agent, or Firm* — Chris Kolefas

(57) ABSTRACT

Methods and apparatuses are described herein for HARQ signaling and communications in wireless networks. For example, a method implemented in a STA comprises receiving a first MU transmission including a first set of HARQ bits, a first set of user data for STAs including the STA, a preamble including information indicating that the MU transmission includes the first set of HARQ bits, and a first set of HARQ Process IDs associated with the first set of (Continued)

HARQ bits; determining a subset of HARQ bits of the first set of HARQ bits; transmitting a response message indicating a reception status of the subset of HARQ bits; and receiving a second MU transmission including a second set of HARQ bits, a second set of user data for the plurality of STAs, and a second set of HARQ Process IDs associated with the second set of HARQ bits.

20 Claims, 20 Drawing Sheets

(56) References Cited

U.S. PATENT DOCUMENTS

| | | | |
|---|---|---|---|
| 2010/0128652 A1 | 5/2010 | Lee et al. | |
| 2013/0273456 A1 | 10/2013 | Bae et al. | |
| 2015/0063250 A1* | 3/2015 | Lahetkangas | H04L 1/1812 370/329 |
| 2016/0149686 A1* | 5/2016 | Tsai | H04L 1/18 370/329 |
| 2016/0277156 A1 | 9/2016 | Bayesteh et al. | |
| 2016/0380272 A1 | 12/2016 | Bae et al. | |
| 2016/0380727 A1 | 12/2016 | Ryu et al. | |
| 2017/0126363 A1* | 5/2017 | Wang | H04L 1/20 |
| 2017/0223675 A1 | 8/2017 | Dinan et al. | |
| 2017/0230136 A1 | 8/2017 | Yan et al. | |
| 2017/0230149 A1* | 8/2017 | Wang | H04L 1/1614 |
| 2018/0139617 A1* | 5/2018 | Belghoul | H04W 16/14 |
| 2020/0052832 A1* | 2/2020 | Tian | H04L 1/1614 |
| 2020/0136764 A1* | 4/2020 | Zhang | H04L 1/0057 |
| 2020/0280399 A1* | 9/2020 | Kim | H04L 1/1864 |

FOREIGN PATENT DOCUMENTS

| | | | | |
|---|---|---|---|---|
| EP | 3780447 A1 * | 2/2021 | | H04L 1/1607 |
| WO | WO 2015035558 A1 | 3/2015 | | |
| WO | WO-2019205803 A1 * | 10/2019 | | H04L 1/1607 |

OTHER PUBLICATIONS

Yang et al., "Discussion on EHT Study Group Formation," IEEE 802.11-18/1180r0 (Jul. 9, 2018).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency Wlan, IEEE P802.11ax/D3.0 (Jun. 2018).

"Part 11: Wireless LAN Medium Access Control (MAC) and Physical Layer (PHY) Specifications", IEEE Standards Association; 802.11-2012, Mar. 29, 2012, 2793 pages.

"IEEE Standard for Information Technology—Telecommunications and information exchange between systems, Local and metropolitan area networks—Specific requirements, Part 11: Wireless LAN Medium Access Control (MAC) and Physical Layer (PHY) Specifications, Amendment 2: Sub 1 GHz License Exempt Operation", IEEE Std 802.11ah-2016 (Amendment to IEEE Std 802.Nov. 2016 as amended by IEEE Std 802.11ai-2016), Dec. 7, 2016, 594 pages.

"View on EHT objectives and technologies", IEEE Draft; 11-18-1171-00-0EHT-VIEW-ON-EHT-OBJECTIVES-AND-TECHNOLOGIES, IEEE-SA Mentor, Piscataway; NJ USA vol. 802.11 EHT Jul. 9, 2018, pp. 1-13.

Hart et al., "Recommended Direction for EHT," IEEE 802.11-18/1549r0 (Sep. 9, 2018).

"IEEE Standard for Information Technology—Telecommunications and information exchange between systems—Local and metropolitan area networks—Specific requirements, Part 11: Wireless LAN Medium Access Control (MAC) and Physical Layer (PHY) Specifications Amendment 5: Television White Spaces (TVWS) Operation", IEEE Standards Association; 802.11af-2013, Dec. 11, 2013, 198 pages.

Porat et al., "Distributed MU-MIMO and HARQ Support for EHT," IEEE 802.11-18/1116r0 (Jul. 6, 2018).

Montemurro, "EHT TIG Agenda," IEEE 802.11-18/1067r2 (Jul. 10, 2018).

Shilo et al., "HARQ for EHT," IEEE 802.11-18/1587r1 (Sep. 3, 2018).

VIVO: "Discussion on mode 1 resource allocation mechanism", 3GPP Draft; R1-1906138 Discussion on Mode 1 Resource Allocation Mechanism, 3rd Generation Partnership Project (3GPP), Mobile Competence Centre ; 650, Route Des Lucioles ; F-06921 Sophia-Antipolis Cede, vol. RAN WG1, No. Reno, USA; May 13, 2019 May 17, 2019 May 13, 2019 (May 13, 2019), XP051727594, Retrieved from the Internet: URL:http://www.3gpp.org/ftp/Meetings%5F3GPP%5FSYNC/RAN1/Docs/R1%2D1906138%2Ezip[retrieved on May 13, 2019].

* cited by examiner

| Tone Sets | 1 Bit | | 2 Bit or 1 Bit High Power | |
|---|---|---|---|---|
| | b0 = 1 | b0 = 0 | b1 = 1 | b1 = 0 |
| 1 | -113,-77,-41,6,42,78 | -112,-76,-40,7,43,79 | -95,-59,-23,24,60,96 | -94,-58,-22,25,61,97 |
| 2 | -111,-75,-39,8,44,80 | -110,-74,-38,9,45,81 | -93,-57,-21,26,62,98 | -92,-56,-20,27,63,99 |
| 3 | -109,-73,-37,10,46,82 | -108,-72,-36,11,47,83 | -91,-55,-19,28,64,100 | -90,-54,-18,29,65,101 |
| 4 | -107,-71,-35,12,48,84 | -106,-70,-34,13,49,85 | -89,-53,-17,30,66,102 | -88,-52,-16,31,67,103 |
| 5 | -105,-69,-33,14,50,86 | -104,-68,-32,15,51,87 | -87,-51,-15,32,68,104 | -86,-50,-14,33,69,105 |
| 6 | -103,-67,-31,16,52,88 | -102,-66,-30,17,53,89 | -85,-49,-13,34,70,106 | -84,-48,-12,35,71,107 |
| 7 | -101,-65,-29,18,54,90 | -100,-64,-28,19,55,91 | -83,-47,-11,36,72,108 | -82,-46,-10,37,73,109 |
| 8 | -99,-63,-27,20,56,92 | -98,-62,-26,21,57,93 | -81,-45,-9,38,74,110 | -80,-44,-8,39,75,111 |
| 9 | -97,-61,-25,22,58,94 | -96,-60,-24,23,59,95 | -79,-43,-7,40,76,112 | -78,-42,-6,41,77,113 |
| 10 | -95,-59,-23,24,60,96 | -94,-58,-22,25,61,97 | | |
| 11 | -93,-57,-21,26,62,98 | -92,-56,-20,27,63,99 | | |
| 12 | -91,-55,-19,28,64,100 | -90,-54,-18,29,65,101 | | |
| 13 | -89,-53,-17,30,66,102 | -88,-52,-16,31,67,103 | | |
| 14 | -87,-51,-15,32,68,104 | -86,-50,-14,33,69,105 | | |
| 15 | -85,-49,-13,34,70,106 | -84,-48,-12,35,71,107 | | |
| 16 | -83,-47,-11,36,72,108 | -82,-46,-10,37,73,109 | | |
| 17 | -81,-45,-9,38,74,110 | -80,-44,-8,39,75,111 | | |
| 18 | -79,-43,-7,40,76,112 | -78,-42,-6,41,77,113 | | |

FIG. 2

| Frame Control | Duration | RA | TA | BAR Control | BAR Information | FCS |

FIG. 3

| Element ID | Length | Element ID Extension | Maximum Number of NDP HARQ Feedback |

FIG. 4

| L-STF | L-LTF | L-SIG | RL-SIG | HE-STF | HE-LTF (4X) | HE-LTF (4X) |

HE-LTF (4X) and HE-LTF (4X) = NDP HARQ 1

FIG. 5

METHODS AND APPARATUS FOR HARQ IN WIRELESS NETWORKS

CROSS-REFERENCE TO RELATED APPLICATIONS

This application is a U.S. national stage application filed under 35 U.S.C. 371 of International Application No. PCT/US2019/059375, filed Nov. 1, 2019, which is a non-provisional filing of, and claims priority to and the benefit of U.S. Provisional Patent Application No. 62/757,555, filed Nov. 8, 2018, the entire contents of each of which are incorporated herein by reference as if fully set-forth herein in their respective entirety, for all purposes.

BACKGROUND

1 Overview of WLAN Systems

A WLAN [1] in Infrastructure Basic Service Set (BSS) mode has an Access Point (AP) for the BSS and one or more stations (STAs) associated with the AP. The AP typically interfaces with a Distribution System (DS) or other type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is essentially peer-to-peer traffic. Such peer-to-peer traffic may also be sent directly between the source and destination STAs with a direct link setup (DLS) using an 802.11e DLS or an 802.11z tunnelled DLS (TDLS). A WLAN using an Independent BSS (IBSS) mode has no AP. Rather, the STAs communicate directly with each other in a peer-to-peer type mode of communication. This mode of communication is referred to as an "ad-hoc" mode of communication.

In the 802.11ac [2] infrastructure mode of operation, the AP may transmit a beacon on a fixed channel, usually the primary channel. This channel may be 20 MHz wide, and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In 802.11n [1], High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac [2], Very High Throughput (VHT) STAs may support 20 MHz, 40 MHz, 80 MHz, and 160 MHz wide channels. The 40 MHz and 80 MHz channels are formed by combining contiguous 20 MHz channels similarly to the manner described above in connection with 802.11n. A 160 MHz channel may be formed either by combining 8 contiguous 20 MHz channels, or by combining two non-contiguous 80 MHz channels. This type of configuration may also be referred to as an 80+80 configuration. For the 80+80 configuration, the data, after channel encoding, is passed through a segment parser that divides it into two streams. IFFT and time domain processing are performed on each stream separately. The streams are then mapped onto the two 80 MHz channels, and the data is transmitted. At the receiver, this mechanism is reversed, and the combined data is sent to the MAC.

Sub 1 GHz modes of operation are supported by 802.11af [3], and 802.11ah [4]. For these specifications, the channel operating bandwidths and carriers are reduced relative to those used in 802.11n [1], and 802.11ac [2]. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for Meter Type Control (MTC) devices in a macro coverage area. MTC devices may have limited capabilities including only support for limited bandwidths, but also include a requirement for a very long battery life.

WLAN systems that support multiple channels and channel widths, such as 802.11n, 802.11ac, 802.11af, and 802.11ah, include a channel that is designated as the primary channel. The primary channel may, but does not necessarily, have a bandwidth equal to the largest common operating bandwidth supported by all STAs in the BSS. The bandwidth of the primary channel is therefore limited by the STA operating in the particular BSS that supports the smallest bandwidth operating mode. In the example of 802.11ah, the primary channel may be 1 MHz wide if there are STAs (e.g. MTC type devices) that only support a 1 MHz mode, even if the AP and other STAs in the BSS support 2 MHz, 4 MHz, 8 MHz, 16 MHz, or other, larger channel bandwidth operating modes. All carrier sensing and Network Allocation Vector (NAV) settings depend on the status of the primary channel, i.e., if the primary channel is busy, for example, due to a STA supporting only a 1 MHz operating mode transmitting to the AP, then the entirety of the available frequency bands is considered busy even though a majority of it is actually idle and available.

In the United States, the available frequency bands that may be used by 802.11ah are from 902 MHz to 928 MHz. In Korea, it is from 917.5 MHz to 923.5 MHz; and in Japan, it is from 916.5 MHz to 927.5 MHz. The total bandwidth available for 802.11ah is 6 MHz to 26 MHz depending on the country.

2 Introduction of 802.11 TGax

Recently, the IEEE 802.11™ High Efficiency WLAN (HEW) Study Group (SG) was created to explore the scope and purpose of a possible, future amendment to enhance the quality of service all users experience for a broad spectrum of wireless users in many usage scenarios, including high-density scenarios in the 2.4 GHz, 5 GHz, and 6 GHz bands. New use cases that support dense deployments of APs, and STAs, and associated Radio Resource Management (RRM) technologies are being considered by the HEW SG. Potential applications for HEW include emerging usage scenarios (such as data delivery for stadium events), high user density scenarios (such as train stations and enterprise/retail environments), and wireless services for medical applications.

In TGax, there is a strong likelihood that the traffic for a variety of applications may comprise short packets. In addition, there may be some network applications that generate short packets, such as: Virtual office applications; TPC ACK (Transmit Control Power Acknowledgement); Video streaming ACK; Device/Controller applications (mice, keyboards, game controls, etc.); Access applications (Probe request/response); Network selection (probe requests and ANQP (Access Network Query Protocol)); and Network management applications (control frames).

Also, 802.11ax may implement UL and DL OFDMA and/or UL and DL MU-MIMO. Hence, designing and defining a mechanism for multiplexing UL random access for different purposes may be addressed in the standard.

2.1 NDP Feedback Design in 11Ax

Section 27.5.6.4 (NPD feedback report types) of [7] describes the Null Data Packet (NDP) feedback design in 802.11ax. The feedback uses a punctured High-Efficiency Long Training Field (HE-LTF) to signal information and, thus, does not require a receiver to perform channel estimation. For a 1 bit feedback, 12 OFDM tones are used with half on and half off. The table of FIG. 2 illustrates the tone set allocations in a 20 MHz channel. It has been shown that this scheme achieves a very low false detection rate (<1e−6) for SNR>=−24 dB.

3 HARQ Technology in Wireless Standards 3.1 Background of HARQ

Hybrid Automatic Repeat reQuest (HARQ) has become an essential transmission error control technique in wireless communication networks, which relies on a combination of error correction codes and retransmissions. HARQ has been adopted in wireless communications standards such as 3GPP UMTS, LTE, and IEEE 802.16 WiMax.

There are two popular types of HARQ combining schemes in the technical literature: Chase Combining (CC) HARQ and Incremental Redundancy (IR) HARQ.

In (CC) HARQ, each retransmission contains the same data and parity bits. A receiver uses Maximum Ratio Combining (MRC) to combine the received packet with previous transmission(s). Chase Combining can be regarded as repetition coding, in which each retransmission increases the Eb/No (Energy per bit, Eb, to noise spectral power density, No, ratio) at the receiver.

For IR HARQ, each retransmission uses a different set of coded bits (different redundancy versions generated by puncturing the encoder output). For turbo code, this means different systematic and parity bits. At each retransmission, the receiver gains extra information. There are variants of IR HARQ, e.g., a retransmission contains only parity bits or it is self-decodable.

In general, HARQ schemes can be categorized as either synchronous or asynchronous, with the retransmissions in each case being either adaptive or non-adaptive. For synchronous HARQ, retransmissions for each process occur at predefined times relative to the initial transmission. Hence, there is no need to signal HARQ process ID, because it can be inferred from retransmission timing. On the other hand, for asynchronous HARQ, retransmissions can occur at any time relative to the initial transmission. Hence, explicit signaling is required to indicate HARQ process ID to ensure that the receiver can correctly associate each retransmission with the corresponding previous transmission.

3.2 HARQ Scheme in LTE Standards

In LTE, the HARQ entity is located in the MAC layer, which is responsible for the transmit and receive HARQ operations. The transmit HARQ operation includes transmission and retransmission of transport blocks, and reception and processing of ACK/NACK signaling. The receive HARQ operation includes reception of transport blocks, combining of the received data, and generation of ACK/NACK signaling based on decoding results. In order to enable continuous transmission while previous transport blocks are being decoded, up to eight HARQ processes in parallel are used to support multiprocess 'Stop-And-Wait' (SAW) HARQ operation. Therefore, multiprocess HARQ interlaces several independent SAW processes in time so that all the transmission resources can be used by one of the processes. Each HARQ process is responsible for a separate SAW operation and manages a separate buffer.

In LTE, asynchronous adaptive HARQ is used in the downlink and synchronous (either adaptive or non-adaptive) HARQ is used in the uplink.

In LTE, the following signaling is used to support HARQ: HARQ process ID (for asynchronous HARQ only); New Data Indicator (NDI) (toggled whenever a new packet transmission begins); Redundancy Version (RV) (RV of the transmission block (for adaptive HARQ only)); and MCS (for adaptive HARQ only).

3.3 HARQ in NR and NR-U

In 3GPP NR (New Radio), the following HARQ features are supported: Multiple HARQ processes; Dynamic and semi-static HARQ ACK codebook; CBG level HARQ retransmission; Asynchronous and adaptive HARQ; and Flexible timing between data transmission and HARQ ACK feedback.

In codeword block group (CBG) level HARQ retransmission in NR, a transmit block (TB) may contain one or more CBGs, which may have their own HARQ ACK bits. Thus, it is possible for the transmitter to retransmit a partial TB. Two CBG related signaling fields, CBG transmission information (CBGTI) and CBG flushing out information (CBGFI), are carried by DCI. CBGTI indicates the CBG(s) that the (re)transmission carries. CBGFI set to 0' indicates that the earlier received instances of the same CBGs being transmitted may be corrupted, and CBGFI set to 1' indicates that the CBGs being retransmitted are combinable with the earlier received instances of the same CBGs.

In 3GPP NR unlicensed (NR-U), HARQ feedback may be transmitted in an unlicensed band. NR-U considers mechanisms to support flexible triggering and multiplexing of HARQ feedback for one or more DL HARQ processes. The following techniques are deemed beneficial for NR-U transmissions by 3GPP:

Techniques to handle reduced HARQ A/N transmission opportunities for a given HARQ process due to LBT failure (potential techniques include mechanisms to provide multiple and/or supplemental time and/or frequency domain transmission opportunities);

Transmission of HARQ A/N for the corresponding data in the same shared channel occupation time (COT) (it is understood that, in some cases, the HARQ Ack/Nack must be transmitted in a separate COT from the one in which the corresponding data was transmitted), and that mechanisms to support this should be identified.

4 Extremely High Throughput Study Group

The IEEE 802.11 Extremely High Throughput (EHT) Study Group (SG) was formed to explore the possibility to further increase peak throughput and improve efficiency of IEEE 802.11 networks. The primary use cases and applications addressed include high throughput and low latency applications such as [5]: Video-over-WLAN; Augmented Reality (AR); Virtual Reality (VR).

Features that have been discussed in the EHT SG to achieve the target of increased peak throughput and improved efficiency include [6]: Multi-AP; Multi-Band; 320 MHz bandwidth; 16 Spatial Streams; HARQ; Full Duplex (in time and frequency domain); AP Coordination; Semi-Orthogonal Multiple Access (SOMA); and new designs for 6 GHz channel access.

BRIEF DESCRIPTION OF THE DRAWINGS

A more detailed understanding may be had from the following description, given by way of example in conjunction with the accompanying drawing, wherein like reference numerals in the figures indicate like elements, and wherein:

FIG. 2 is a table showing the tone set allocations in a 20 MHz channel for 802.11;

FIG. 3 is a diagram illustrating an exemplary BlockAckReq frame format for implementing Multi HARQ Process BAR in accordance with an embodiment;

FIG. 4 is a diagram of a HARQ Feedback Report parameter frame in accordance with an embodiment;

FIG. 5 is diagram of a HARQ NDP Feedback Frame for Single HARQ feedback for a single STA in accordance with a first embodiment;

DETAILED DESCRIPTION

1 Example Networks for Implementation of the Embodiments

Figure 1A:
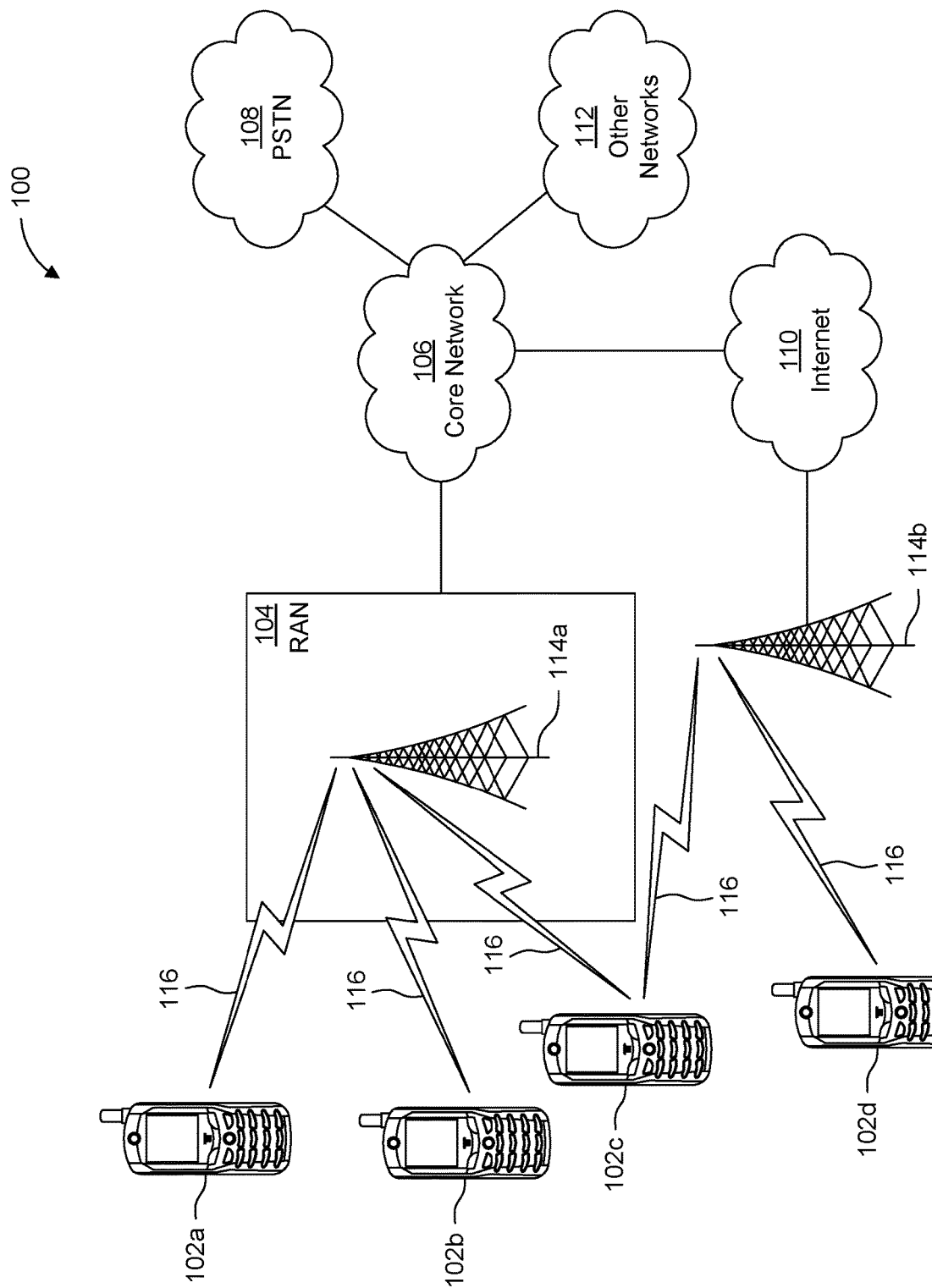
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications system 100 may also include a base station 114a and/or a base station 114b. Each of the base stations 114a, 114b may be any type of device configured to wirelessly interface with at least one of the WTRUs 102a, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
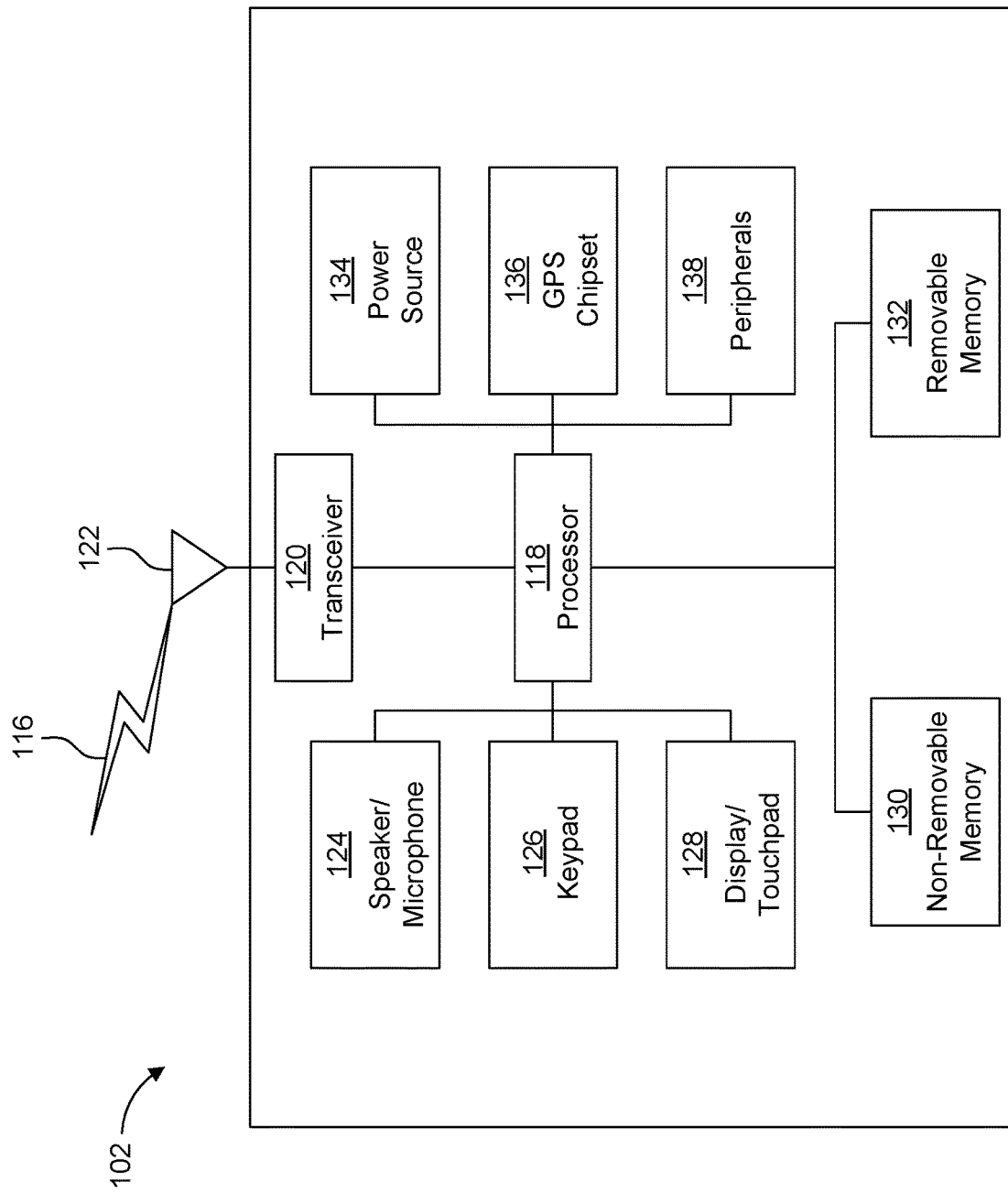
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
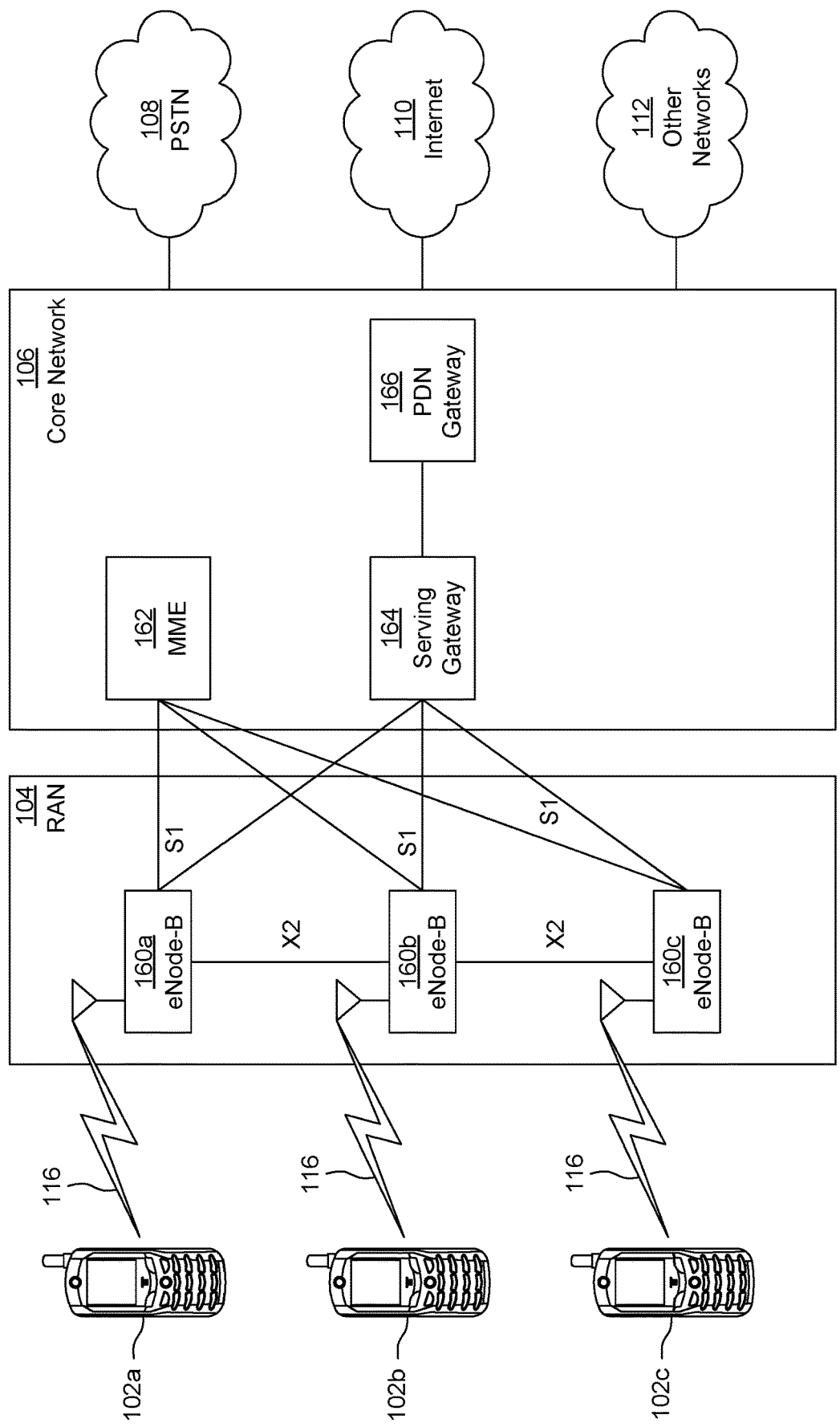
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or NAV settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country.

Figure 1D:
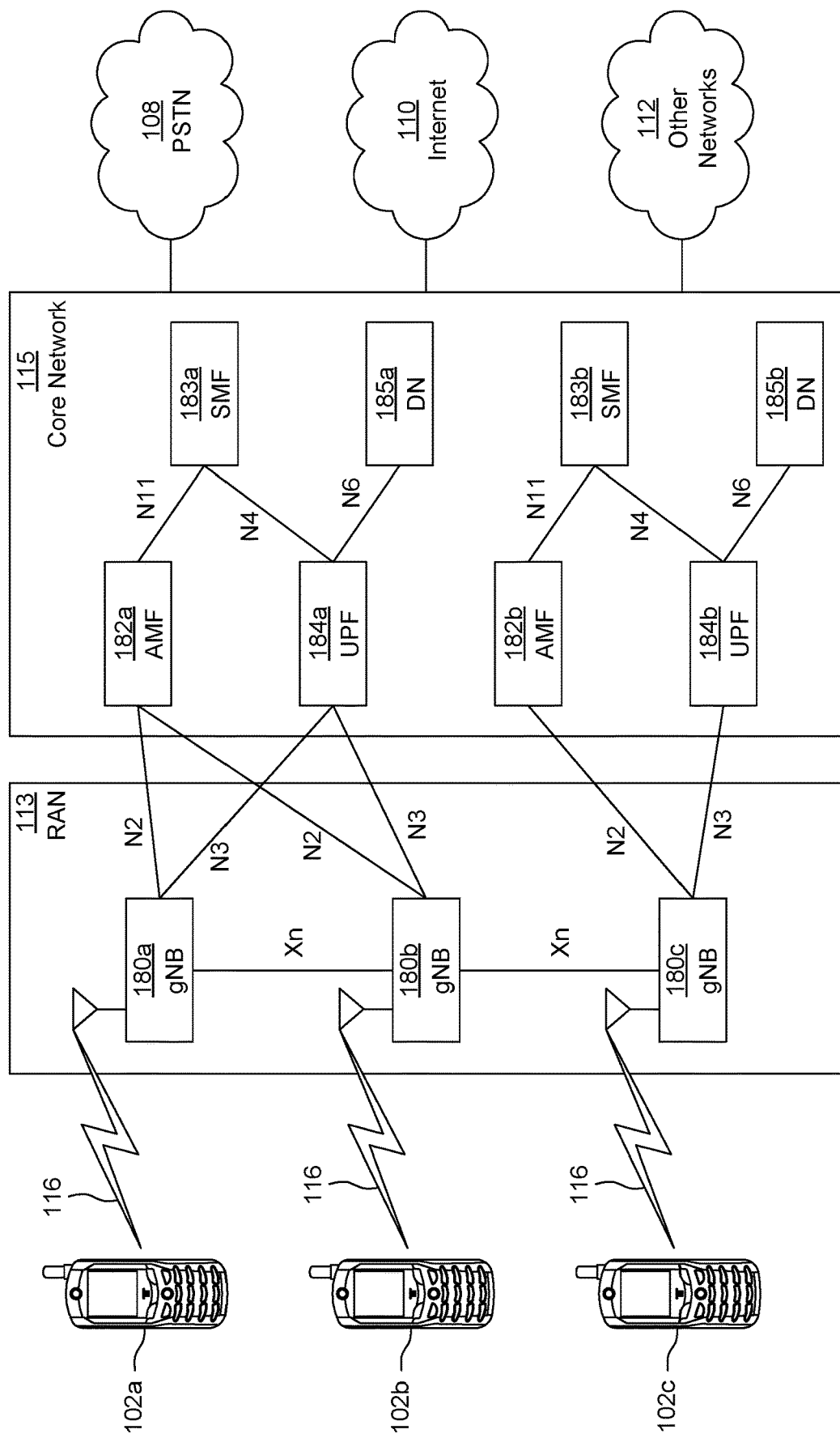
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP-based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

2 HARQ Signaling and Acknowledgement Procedures in WLAN

In order to support HARQ operations in WLAN, new signaling designs as well as new signaling procedures that specifically target the HARQ operations are needed to enable communications between STAs that are HARQ capable. Such signaling may include ACK, NACK, Trigger Frame, BlockAck, Multi-STA BlockAck, etc.

2.1 HARQ Signaling and Acknowledgement Procedures Using ACK/NACK and Multi-STA ACK In order to support HARQ operations in WLAN, new signaling should be defined, including one or more of the following types of designs: HARQ ACK, HARQ NACK, HARQ Trigger frames, Multi-HARQ Process ACK/NACK/BA, Multi-TID Multi HARQ Process ACK/NACK/BA, and Multi-STA Multi-TID Multi HARQ Process ACK/NACK/BA, HARQ Block ACK Request (BAR) frames, Multi-User (MU) HARQ BAR frames.

An ACK frame may be transmitted by a receiving STA immediately in response to a HARQ transmission to indicate that the HARQ transmission has been correctly received and decoded. The transmitter of the HARQ transmission may then delete the copies of the packets associated with the HARQ transmission and may continue to attempt to transmit the remaining packets in its queues. In another implementation, an ACK frame may contain the HARQ process ID or Redundancy Version (RV) number for which the ACK is transmitted.

A Multi HARQ Process BAR may be used to solicit ACK/NACK/BA from a STA. A Multi HARQ Process BAR may be implemented using the general BlockAckReq frame format shown in FIG. 3. In order to indicate that the current frame is a Multi-HARQ Process BAR, one or more reserved bits in the BAR control field may be used to indicate that the current frame is a Multi-HARQ process BAR.

In one example, the Multi-TID (Traffic IDentification) subfield (not shown) of the Bar Control field may be set to "0", one or more bits in B5-B11 in the Bar control field may be used to indicate that the current frame is the Multi-HARQ Process variant of the BlockAckReq frame. In addition, one or more bits in the TID_Info subfield (not shown) of the Bar Control field or one or more bits of the currently reserved bits B5-B11 may be used to indicate one or more HARQ process IDs for which ACK/NACK/BA is being requested. One or more bits in the BAR control field may indicate whether ACK/NACK/BA is being requested. In another example, the Multi-HARQ Process variant of the BlockAckReq frame may be indicated by setting the Multi-TID subfield of the Bar Control field to "0", Compressed Bitmap Subfield of the Bar Control field to "0", and GCR Mode subfield of the Bar Control field to "0" (subfields not shown in FIG. 3).

In another example, one of the reserved values in the "BAR Type" subfield of the Bar Control field may be used to indicate that the current frame is a Multi-HARQ process BAR. The TID_Info field in the BAR Control field may be used to indicate the HARQ process IDs for which ACK/NACK/BA is being requested. Alternately or additionally, the BAR Information subfield of the Bar Control field may include the indication of HARQ process IDs for which ACK/NACK/BA is being requested. In one example, the BAR Information subfield may contain all the HARQ Process IDs for which ACK/NACK/BA is being requested. In another example, a "Starting HARQ Process ID" may be indicated in addition to a bit map. The bit map may indicate with a "1" those HARQ Process IDs for which ACK/NACK/BA is being requested starting with the HARQ process ID indicated in the "Starting HARQ Process ID" field. The size of the bitmap or the number of HARQ process IDs included may be negotiable and may be limited by the parameter Number of Concurrent HARQ processes supported by the STA or Concurrent HARQ Processes per TID supported by the STA, which may be indicated as a part of EHT capabilities during the association process.

Additionally or alternatively, a Multi-TID Multi-HARQ BAR may be used to solicit ACK/NACK/BA from a STA for one or more HARQ processes within one or more traffic streams identified by one or more TIDs. A Multi-TID Multi-HARQ Process BAR may be implemented using the general BlockAckReq frame format shown in FIG. 3. In order to indicate that it is a Multi-TID Multi-HARQ Process BAR, one or more reserved bits in the BAR control field may be used to indicate that the current frame is a Multi-TID Multi-HARQ process BAR. For example, the BAR Type subfield may be used to indicate that the current BAR frame is of the Multi-TID Multi-HARQ Process Type. For example, B1 of the BAR Type subfield may be set to "1". Thus, the BAR Type subfield may be set to an odd number, such as 7, 9, or 11 to indicate that the current BAR frame is of the Multi-TID Multi-HARQ Process variant. The TID Info field may indicate the number of TIDs for which ACK/NACK/BA is being requested. In another example, the TID info field may indicate the number of TID/HARQ Process ID combos for which ACK/NACK/BA is being requested. The BAR information field may contain a number of fields, the number of such fields being indicated in the TID Info subfield, with each field containing TID value, HARQ Info and Bitmap. The TID value may indicate the value of the TID for which HARQ responses may be solicited. In one example, each TID/HARQ Process ID field contains all the HARQ Process IDs for which ACK/NACK/BA is being requested. In another example, a "Starting HARQ Process ID" may be indicated in addition to a bit map. The bit map may indicate with "1" which HARQ Process IDs ACK/NACK/BA are being requested starting with the HARQ process ID indicated in the "Starting HARQ Process ID" field. The size of the bitmap or the number of HARQ process IDs included may be negotiable and may be limited by the parameters Number of Concurrent HARQ processes supported by the STA or Concurrent HARQ Processes per TID supported by the STA, which may be indicated as a part of EHT capabilities during the association process.

Additionally, Multi-STA Multi-TID Multi-HARQ BAR may be defined to solicit HARQ responses for multiple STAs with multiple TIDs and Multiple HARQ Process IDs. The Multi-STA Multi-TID Multi-HARQ BAR may largely follow the definition of MU-BAR, with the BAR type in the BAR control field set to indicate that the current frame is a Multi-STA Multi-TID Multi-HARQ BAR. The BAR information field may contain one or more bits to indicate the TID as well as the HARQ Process ID. For example, one or more reserved bits in the Per TID Info field may be used to indicate the HARQ Process ID for which HARQ responses are solicited. One or more specific values may be used to indicate that regular ACK/BA (and hence, no HARQ response) is requested, for a non-HARQ transmission. A STA, for example, an AP, may use a Multi-STA Multi-TID Multi-HARQ BAR to solicit the responses from one or more STAs, for one or more TIDs, and for one or more HARQ Process IDs. Alternatively, the BAR information field may, e.g., use one or more reserved bits to indicate the number of HARQ Process IDs as well as the starting HARQ Process ID for which HARQ responses are solicited. One or more specific values may be used to indicate that the regular ACK or BA (and hence not HARQ) response is requested for a non-HARQ transmission, in which case the BAR information field may follow that of the regular Multi-STA BA.

A STA may use Multi-HARQ BA, a Multi-TID Multi-HARQ BA, and/or a Multi-STA Multi-TID Multi-HARQ BA as a response to a Multi-HARQ BAR, Multiple-TID Multi-HARQ BAR, and/or Multi-STA Multi-TID Multi-HARQ BAR.

A Multi-HARQ BA generally follows the format of the generic BlockAck frame, with the BA Type field set to a value indicating that the current frame is a Multi-HARQ BA. A STA may set the TID_Info field to the value of a particular TID, as well as indicate the HARQ Process ID bitmap size or the number of HARQ Process ID bitmaps. A STA may set the BA information field in such a way that it may contain the starting HARQ Process ID as well as a bitmap containing bits indicating for which HARQ Process IDs HARQ Responses are provided. Encoding for each of the HARQ Process IDs may include one or more bits to indicate one or more potential responses including: ACK, NACK, No Signal Detected, Interference, Collision, Restart of HARQ Process Requested.

A STA may use a Multi-TID Multi-HARQ BA to respond to a Multi-TID Multi-HARQ BAR in order to provide responses to one or more TIDs with one or more HARQ Process IDs. The STA may set the BA Type in the BA Control field to indicate that the frame is of the type Multi-TID Multi-HARQ BA. The BA information field may include one or more TID/HARQ fields for each TID. The STA may indicate in the Per TID info field the starting HARQ Process ID. In another implementation, the Block Ack Starting Sequence Control field may include the starting HARQ Process ID. The Block ACK bitmap may include the responses for which HARQ Process IDs HARQ responses are provided. Encoding for each of the HARQ Process IDs may include one or more bits to indicate one or more potential responses including: ACK, NACK, No Signal Detected, Interference, Collision, Restart of HARQ Process Requested.

A STA, for example, an AP, may use a Multi-STA Multi-TID Multi-HARQ BA to provide responses to one or more STAs, each with one or more TIDs with one or more HARQ Process IDs. The STA may set the BA Type in the BA Control field to indicate that the frame is of the type Multi-STA Multi-TID Multi-HARQ BA. The BA information field may include one or more Per AID/TID/HARQ fields for each AID/TID. The STA may indicate in the Per AID TID info field the starting HARQ Process ID. In another implementation, the Block Ack Starting Sequence Control field may include the starting HARQ Process ID. The Block ACK bitmap may include the responses for which HARQ Process IDs HARQ responses are provided starting with the Starting HARQ Process ID. Encoding for each of the HARQ Process IDs may include one or more bits to indicate one or more potential responses including: ACK, NACK, No Signal Detected, Interference, Collision, and Restart of HARQ Process Requested.

An AP may use a HARQ trigger frame to trigger transmissions that may include one or more HARQ transmissions. The HARQ trigger frame design may largely follow the design of the generic trigger frame. The Trigger Type subfield in the Common Info field may include values to indicate that the trigger frame is a HARQ trigger frame. Alternately or additionally, the User Info field in the trigger frame that is meant to trigger HARQ transmissions may include one or more bits to indicate so. The Trigger Dependent User Info field may include information regarding the triggered HARQ transmission, such as HARQ process ID, and/or whether a new transmission, retransmission or new RV is being triggered. One or more STAs that are triggered by the HARQ trigger frame may commence their transmissions one Short Interframe Space (SIFS) or HARQ IFS (H IFS) after the end of the HARQ trigger frame, or Aggregated MAC Protocol Data Unit (A-MPDU) or Aggregated PLCP (Physical Layer Convergence Procedure) protocol data unit (A-PPDU) that contains the HARQ Trigger frame. One or more of the transmissions that are triggered may contain one or more HARQ transmissions, which may be implemented as A-MDPU or A-PPDU. Each HARQ transmission may be contained in a separate PPDU or in a A-PPDU.

2.2 HARQ Signaling and Response Procedures Using NDP Feedback Report

A Null Data Packet (NDP) feedback report may be used by an AP to request HARQ feedback from multiple STAs simultaneously. In this method, a set of STAs receives a HARQ NDP Feedback Report Poll (HARQ NFRP) Trigger frame from the AP and, at a SIFS duration after the reception of the frame, transmits a HARQ NDP feedback frame to the transmitter indicating the status of one or more HARQ transmissions for specific HARQ process IDs. For example, the NFRP may contain a field of Feedback Type indicating NDP HARQ Feedback. The HARQ NDP feedback may be an ACK or a NACK. Alternatively, the HARQ NDP feedback may be an ACK, a NAK, an indication of a collision (COL), no signal detected, or Interference.

In an embodiment, a STA may set the HARQ NDP Feedback Report Support subfield in the High Efficiency (HE) or EHT Capabilities element to 1 if it supports HARQ NDP feedback reports and set it 0, otherwise. In an embodiment, a STA shall not transmit a HARQ NDP feedback report response unless it is explicitly enabled by an AP. In an embodiment, the inter frame space between a PPDU that contains an HARQ NFRP Trigger frame and the HARQ NDP feedback report poll response is SIFS.

In an embodiment, a STA commences the transmission of a HARQ NDP feedback report response at the SIFS time boundary after the end of a received PPDU, when all the following conditions are met:

The received PPDU contains a HARQ NFRP Trigger frame;

The STA is scheduled by the HARQ NFRP Trigger frame;

The HARQ NDP feedback report support subfield in the HE or EHT MAC Capabilities Information field is set to 1; and The STA intends to provide a response to the type of the HARQ NDP feedback contained in the HARQ NFRP Trigger frame.

In an embodiment, a STA that does not satisfy all of the above conditions shall not respond to the HARQ NFRP Trigger frame.

In an embodiment, a STA is scheduled to respond to the NFRP Trigger frame if all the following conditions are met:

The STA is associated with the Basic Service Set Identifier (BSSID) indicated in the TA field of the HARQ NFRP Trigger frame or the STA has dot11MultiBSSIDActivated set to true and is associated with a non-transmitted BSSID of a multiple BSSID set and the TA field of the HARQ NFRP Trigger frame is set to the transmitted BSSID of that multiple BSSID set;

The STA's AID is greater than or equal to the starting Associated Identifier (AID) and less than starting AID+ NSTA, using the Starting AID subfield in the eliciting Trigger frame, and wherein NSTA is the total number of STAs that are scheduled to respond to the HARQ NFRP Trigger frame. NSTA is calculated based on the UL BW subfield and the Multiplexing Flag subfield from the eliciting Trigger frame.

The STA's AID is explicitly signaled in the HARQ NFRP Trigger frame. In one embodiment, the STA's AID and the number of HARQ feedback bits are signaled.

A non-AP HE STA shall obtain HARQ NDP Feedback Report parameter values from the most recently received HARQ NDP Feedback Report Parameter Set element carried in the Management frames received from its associated AP.

In an embodiment, the HARQ NFRP signals the required information to the STAs. It may include the following fields:

1. The STAs to be addressed and their resource allocation;
2. Number of HE-LTF symbols: This will be modified from 1 (for NDP feedback for traffic request) to the maximum number of HARQ feedback for all the addressed STAs;
3. HARQ ID of process to feed back (which may be placed in the User Info field).

A HARQ Feedback Report parameter frame such as illustrated in FIG. 4 may be used to indicate the maximum number of ACK/NAK/Collision values that may be fed back.

The HARQ NDP Feedback frame may signal the HARQ status in the HE-LTF. In one embodiment, the HARQ NDP feedback may be limited to only one OFDM symbol, as shown in FIG. 5.

Figure 6:
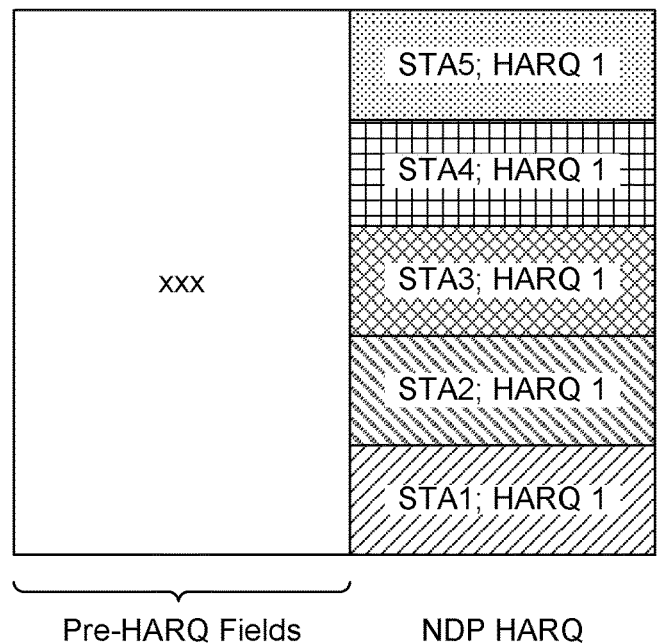
FIG. 6 is a diagram of a HARQ NDP Feedback Frame for Single HARQ feedback for multiple STAs in accordance with a second exemplary embodiment.

Information for only a single packet may be fed back or information for multiple packets may be fed back. In the case of single packet feedback (as shown in FIG. 6), the resource, e.g., the RU_TONE_SET_INDEX parameter, may be set based on the AID, starting AID, and Bandwidth (BW) with the following equation, with the value of the Starting AID subfield in the User Info field of the eliciting Trigger frame, resulting in:

RU_TONE_SET_INDEX=(AID−Starting AID)mod $(18 \times 2^{BW})$

Alternatively, it may be set based on the relative position of the AID in the User Info field, e.g., for user (i), RU_TONE_SET_INDEX(i)=User Info Field 1(i). Note that if the number of User Info fields is less than the maximum RU_TONE_SET_INDEX, then the additional resources are padded. In this case, either no information is sent in the resource or all the tones of the resource are sent (to satisfy the occupied channel bandwidth requirement).

Figure 7:
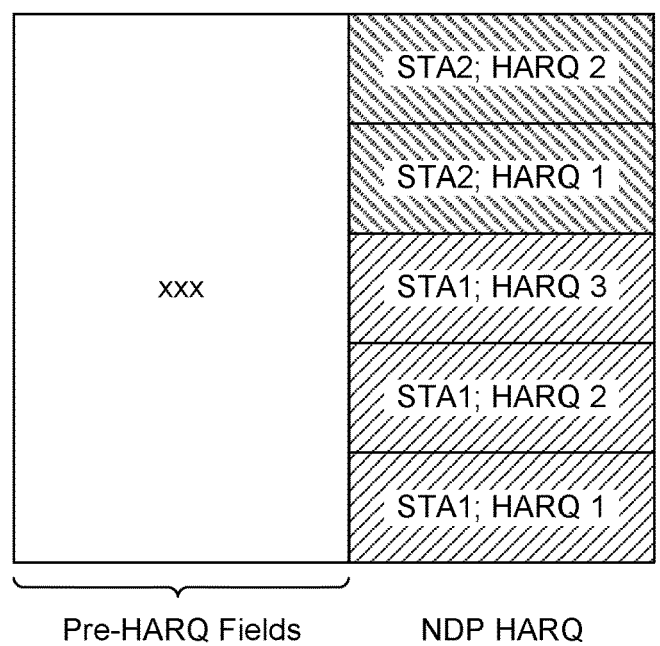
FIG. 7 is a diagram of a HARQ NDP Feedback Frame for Multiple HARQ feedback on one or more RUs in accordance with a third exemplary embodiment.

In the case of multiple packet feedback (as shown in FIG. 7), the resource, e.g., the RU_TONE_SET_INDEX parameter, may be set based on the AID, starting AID, Bandwidth (BW), and the number of resources allocated for HARQ feedback for that specific STA, N, with the following equation, with the value of the Starting AID subfield and user resources subfield, N, in the User Info field of the eliciting Trigger frame resulting in:

Relative Position AID(i)=(AID−Starting AID)mod $(18 \times 2^{BW})$

RU_TONE_SET_INDEX(i,1)=sum{relative position AID(i−1)*N(i−1)}+1

RU_TONE_SET_INDEX(i,N)=sum{relative position AID(i−1)*N(i−1)}+N

Alternatively, it may be set based on the relative position of the AID in the User Info field and the value N.

Figure 8:
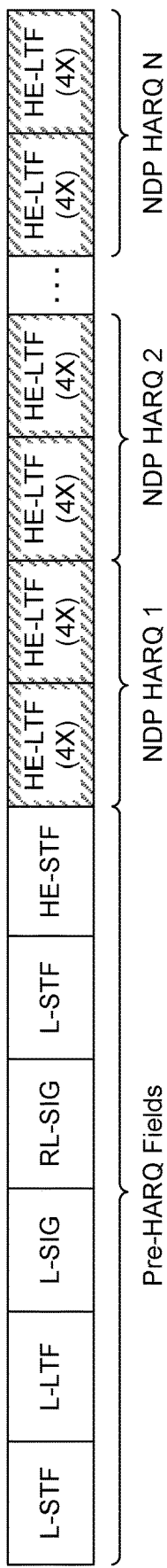
FIG. 8 is a diagram of a HARQ NDP Feedback Frame for Multiple HARQ feedback on the same RU/channel in accordance with a fourth exemplary embodiment.
Figure 9:
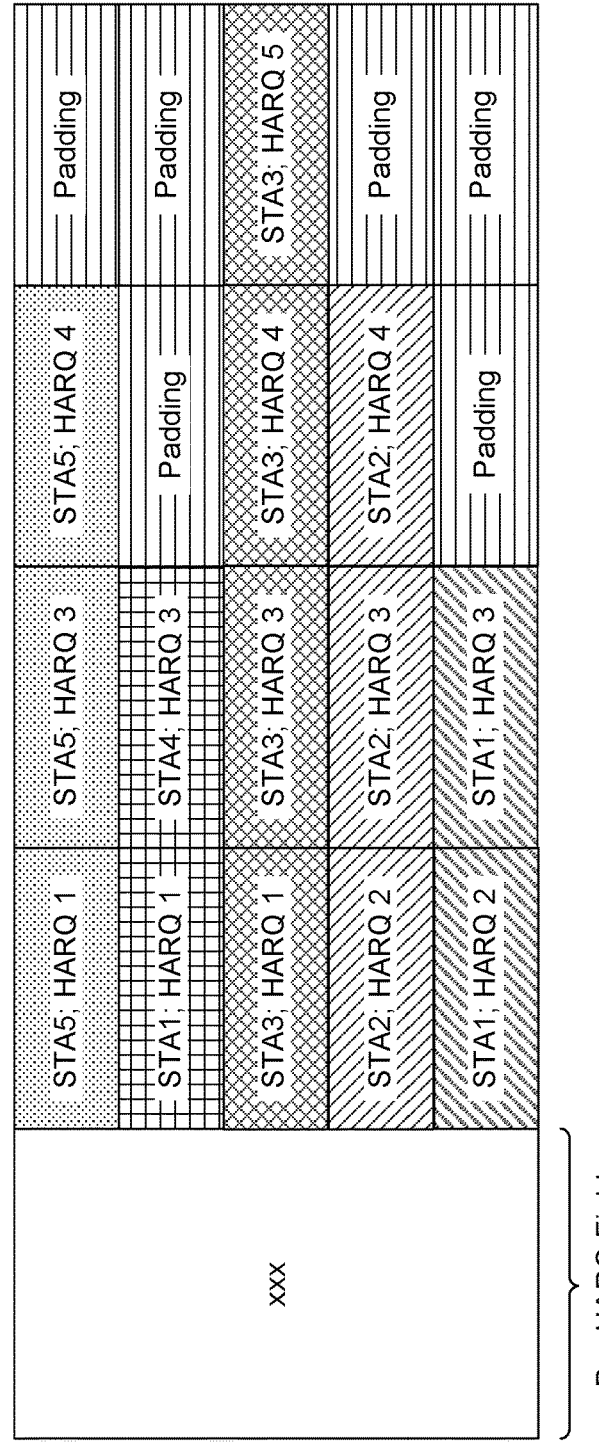
FIG. 9 is a diagram of a HARQ NDP Feedback Frame for Multiple HARQ feedback and multiple resources in accordance with a fifth exemplary embodiment.

In one example, feedback for more than one packet (e.g., N packets) may be transmitted in N HARQ feedback symbols as shown in FIG. 8. This may be allocated for multiple users as shown in FIG. 9, in which a single frequency resource is allocated to a single STA. Alternatively, multiple frequency resources may be allocated to a single STA.

To signal the presence of an ACK, NAK, or collision, the STA may select from a subset of LTF values with a specific tone mapping for each type. In one example, the NDP feedback allocation may be composed of 12 subcarriers, wherein ACK is assigned 4 subcarriers, NAK is assigned 4 subcarriers, and COL is assigned 4 subcarriers. In another example, the NDP feedback allocation may be composed of 12 subcarriers, wherein ACK is assigned 6 subcarriers, and NAK is assigned 6 subcarriers. In yet another example, an NDP feedback allocation may be composed of 18 subcarriers, wherein ACK is assigned 6 subcarriers, NAK is assigned 6 subcarriers, and COL is assigned 6 subcarriers.

Figure 10A:
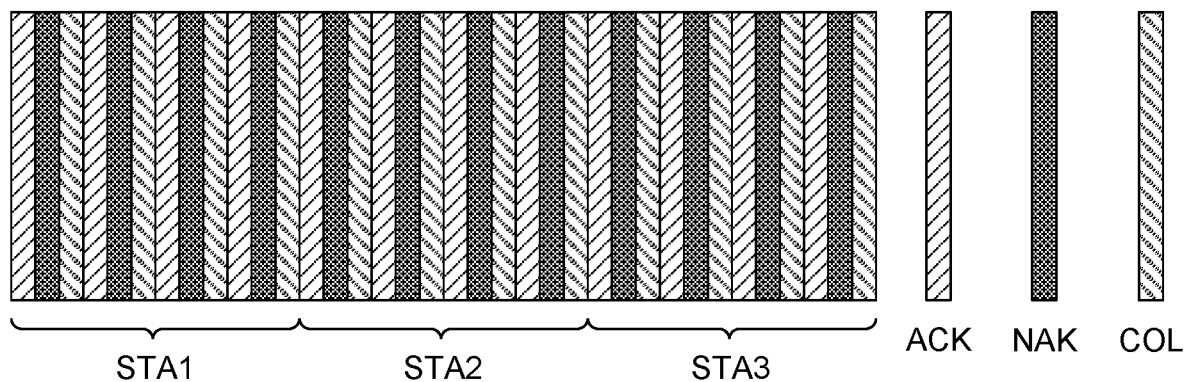
FIGS. 10A and 10B are diagrams illustrating exemplary tone mappings for HARQ NDP feedback.
Figure 10B:
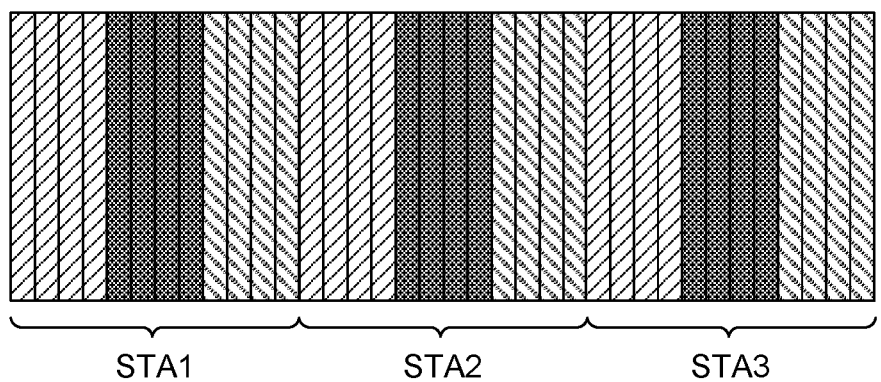

The subcarrier assignments may be contiguous or distributed (e.g. interlaced) in the resource. For instance, FIG. 10A illustrates a distributed assignment of subcarriers wherein ACK is assigned 4 subcarriers, NAK is assigned 4 subcarriers, and COL is assigned 4 subcarriers, whereas FIG. 10B illustrates a contiguous assignment of the same subcarriers.

3 HARQ MAC Procedures in WLAN

Many new MAC features have been introduced in the 802.11ax draft, including UL and DL OFDMA, broadcast Target Wake Time (TWT), Trigger-based UL transmission, etc. In order to enable HARQ operations in WLAN, general medium access procedures, including scheduled, triggered, and random access HARQ design, should be defined, including efficient and suitable medium access protocols to support efficient HARQ operations in WLAN.

3.1 HARQ DL MAC Procedures

Figure 11:
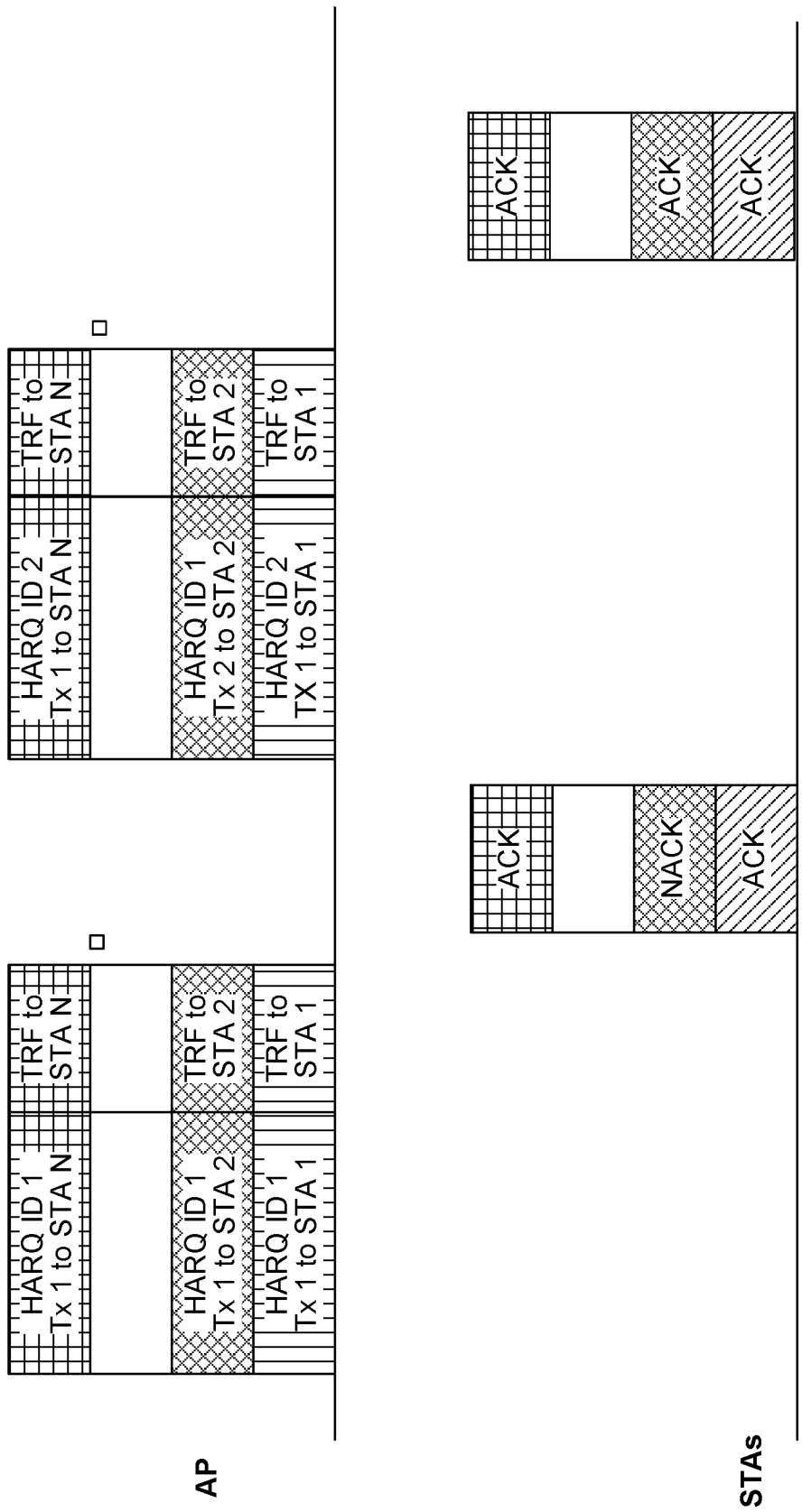
FIG. 11 is a timing diagram showing a HARQ DL MAC procedure in accordance with an embodiment.

Method 1:

A HARQ DL MAC procedure in accordance with a first embodiment is shown in FIG. 11. In FIG. 11, each block represents a Resource Unit (RU) and the vertical dimension represents elapsed time. A RU may be of any type of resource (e.g., time, frequency, space, or any combinations thereof). In order to support HARQ operations in the downlink between an AP and one or more STAs, the following MAC procedures may be used.

An AP may transmit HARQ transmissions to multiple STAs, e.g., STA 1 to STA N, concurrently on different Resource Units (RUs) in a DL OFDMA transmission. The preamble of a Multi-User (MU) packet may contain indication that the current transmission may include one or more HARQ transmissions. The preamble of each A-MPDU or A-PPDU or PPDU may contain indication that it may include one or more HARQ transmissions. Each HARQ transmission may contain or be preceded by a HARQ Indication and may contain or be preceded by a distinct delimiter pattern so that the receiving STA may discover the start of a HARQ transmission. The HARQ transmissions may contain a HARQ Process ID in its preamble or in delimiter patterns or any other parts indicated by the preamble of the A-MPDU or A-PPDU.

The AP may carry a Trigger frame in the same A-MPDU or A-PPDU as the HARQ transmission to trigger responses for HARQ processes. The Trigger frame may contain an indication that it is a trigger frame for a HARQ process, as well as the desired HARQ Process ID. Similarly, the response may be scheduled by a response scheduling preamble or header which may contain the desired HARQ Process IDs.

The receiving STA may transmit responses, which may be scheduled by response scheduling header/preamble or triggered by the trigger frame, for example, a SIFS time or a HARQ IFS (HIFS) separation from the end of the previous transmission. The response to a HARQ process or transmission may include a number of possible values, such as ACK, NACK, No Signal Detected, Collision, and Restart HARQ Process Requested.

The AP may then conduct additional transmissions and HARQ transmissions based on the feedback received from the STAs. For example, as shown in FIG. 11, the AP may start a new HARQ process with new transmissions associated with HARQ ID 2 to STA 1 and STA N, since an ACK has been received from STA 1 and STA N indicating that the previous HARQ transmissions have been correctly decoded by STA 1 and STA N. The AP may start to transmit Transmission 2 of HARQ Process ID 1 to STA 2 since a NACK has been received from STA 2 indicating that STA 2 has not successfully decoded the HARQ transmission. STA 2 may also include additional feedback in the NACK frame on recommended next step action, including MCS recommendations and whether retransmission or additional RVs are desired. Transmission 2 of HARQ Process ID 1 may be a retransmission or may be a different RV of HARQ Process ID 1, which may be based on the recommended actions included in the NACK from STA 2.

Similarly, the new HARQ transmissions by the AP may be part of an A-MPDU or A-PPDU which may include trigger frames or response scheduling headers to solicit responses from the receiving STAs.

The receiving STAs may subsequently provide responses.

Figure 12:
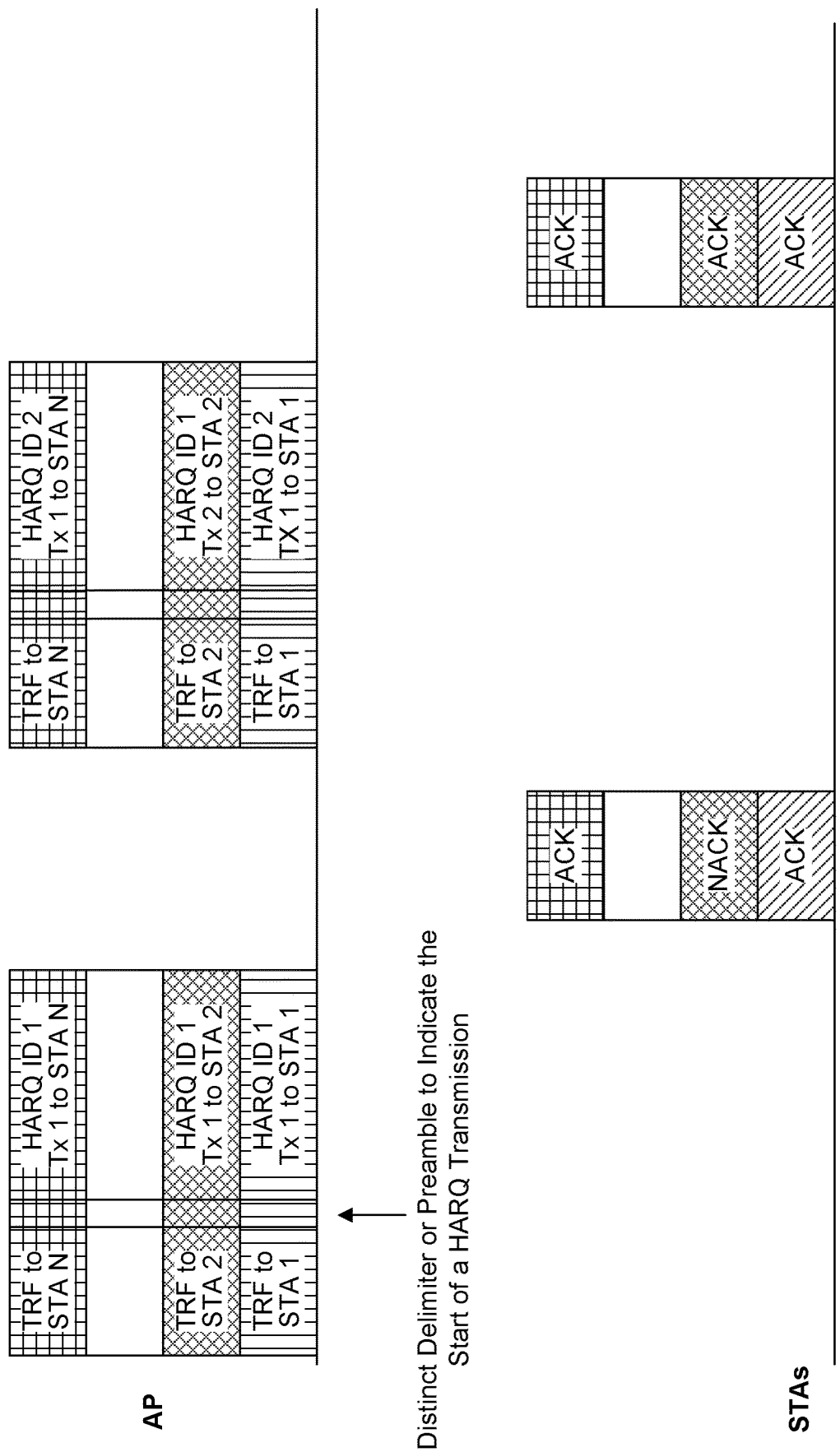
FIG. 12 is a timing diagram showing a HARQ DL MAC procedure in accordance with another embodiment.

In another implementation, the A-MPDU or A-PPDU carrying the downlink HARQ transmissions may be composed of two parts, one part of which contains a A-MPDU, while the remaining part may contain a A-PPDU that may contain one or more HARQ transmissions, as shown in FIG. 12. The A-MPDU may be transmitted first and may contain all regular packet transmissions, such as ACK/NACK/BA packets, trigger frames, and other management or control frames, which may be separated by delimiters between the MPDUs. The A-MPDU may also contain indications and/or scheduling for the subsequent HARQ transmission(s). The A-MPDU may contain information of the upcoming HARQ transmissions, such as for each HARQ transmission, the HARQ Process ID, the targeting receiving STA, the starting time of the HARQ transmission, the Modulation and Coding Scheme (MCS), and the RV numbers of the HARQ transmission. Any or all of these indications may be included in the PLCP or MAC header of the entire A-MPDU as well. Additionally or alternatively, any or all of these indications may be included in the PLCP or MAC header of the entire A-PPDU as well, which may contain the PPDU that carries the A-MPDU.

In another implementation, one or more of the MPDUs that are not a part of the HARQ transmissions may also be grouped into one or more A-MPDUs and may be transmitted in multiple PPDUs of the A-PPDU.

After transmitting the PPDU that carries the A-MPDU, the transmitting STA may continue to transmit one or more PPDUs, which may contain the HARQ transmissions. Each PPDU or HARQ transmission may contain or be preceded by a preamble or separation field which may contain a set of delimiter and/or training fields. Such a preamble or separation field may contain a distinct pattern of bits such as delimiters, training fields such as LTF, STF, or other type of fields to announce the start of a new PPDU or a new HARQ transmission. The preamble or separation field may also contain information of the upcoming HARQ transmission, such as the HARQ Process ID, the targeting receiving STA, the starting time of the HARQ transmission, the MCS, the RV numbers of the HARQ transmission, retransmission of a previous HARQ transmission, the length of the upcoming HARQ transmission or PPDU, the length or duration of the upcoming HARQ transmission(s) or PPDU(s), as well as whether more PPDUs or HARQ transmissions will follow the upcoming HARQ transmission or PPDU.

The remainder of the procedure may be largely similar to those described above, but with the A-MPDU or A-PPDUs containing HARQ transmissions carrying one or more PPDUs carrying A-MPDUs that are not transmitted as a part of a HARQ process, and additionally carrying one or more PPDUs that carry the HARQ transmissions. The PPDU carrying the (A-)MPDU that is not a part of any HARQ transmissions may contain scheduling, indication, or information related to the upcoming PPDUs and/or HARQ transmissions. Such information may also be contained in the first PPDU in the A-PPDU or in the first preamble of the first PPDU in the A-PPDU. The PPDUs carrying HARQ transmissions may contain or be preceded with a preamble and separation field that may contain delimiters, identifiers for HARQ transmissions, training fields, and/or information related to the upcoming HARQ transmission(s) or PPDUs.

In yet another implementation, the (A-)MPDU or PPDU containing one or more MPDUs that are not transmitted as a part of HARQ transmission may be transmitted at the end of the A-PPDU, or anywhere within the A-PPDU.

Method 2:

The following design is related to example DL HARQ operations and transmission procedures.

In one embodiment, the TF or (A-)PPDU header assigns whether NDP feedback or the BA should be sent in response. In one option, if the assignment is the BA/ack feedback, the AP or non-STA may signal to flush the HARQ buffer such that MPDU-level retransmission may be started with a different MCS.

In one embodiment, the TF may also assign the slave AP HARQ feedback resources for reporting overheard HARQ transmissions. Based on the feedback, the master AP may initiate a joint HARQ re-transmission.

In one embodiment, the NDP feedback resource/tone sets may coincide with the RU assigned to the STA. When the STA performs NDP feedback, the 'on' tones of the feedback may serve as an auxiliary reciprocity NDP sounding signal to the master and slave APs.

In one embodiment, the HARQ resource is implicitly assigned based on the ID of the RU assigned. In another embodiment, the HARQ resource is implicitly assigned based on the non-AP STA's identity.

In the original HARQ transmission, one or more IDs may be associated with the (A-)PPDU, to be referenced in the retransmission In the retransmission, the header of the (A-)PPDU or TF may identify a portion of retransmitted OFDM symbols/codewords and/or redundancy version, with reference ID to the original HARQ transmission.

In one embodiment, the receiver simply replies with a BA and optionally includes an indication that the receiver is buffering undecoded HARQ samples. The transmitter, based on the bitmap on the BA, derives OFDM symbols/codewords to be retransmitted.

In one embodiment, the HARQ ACK/NACK from any STA resets the initiator contention window. The no response NDP feedback from all STAs may cause the AP to increase the initiator contention window.

3.2 HARQ DL Multiple Stop and Wait MAC Procedures

The following exemplary methods may enable and support HARQ downlink multiple stop and wait MAC procedures.

Figure 13:
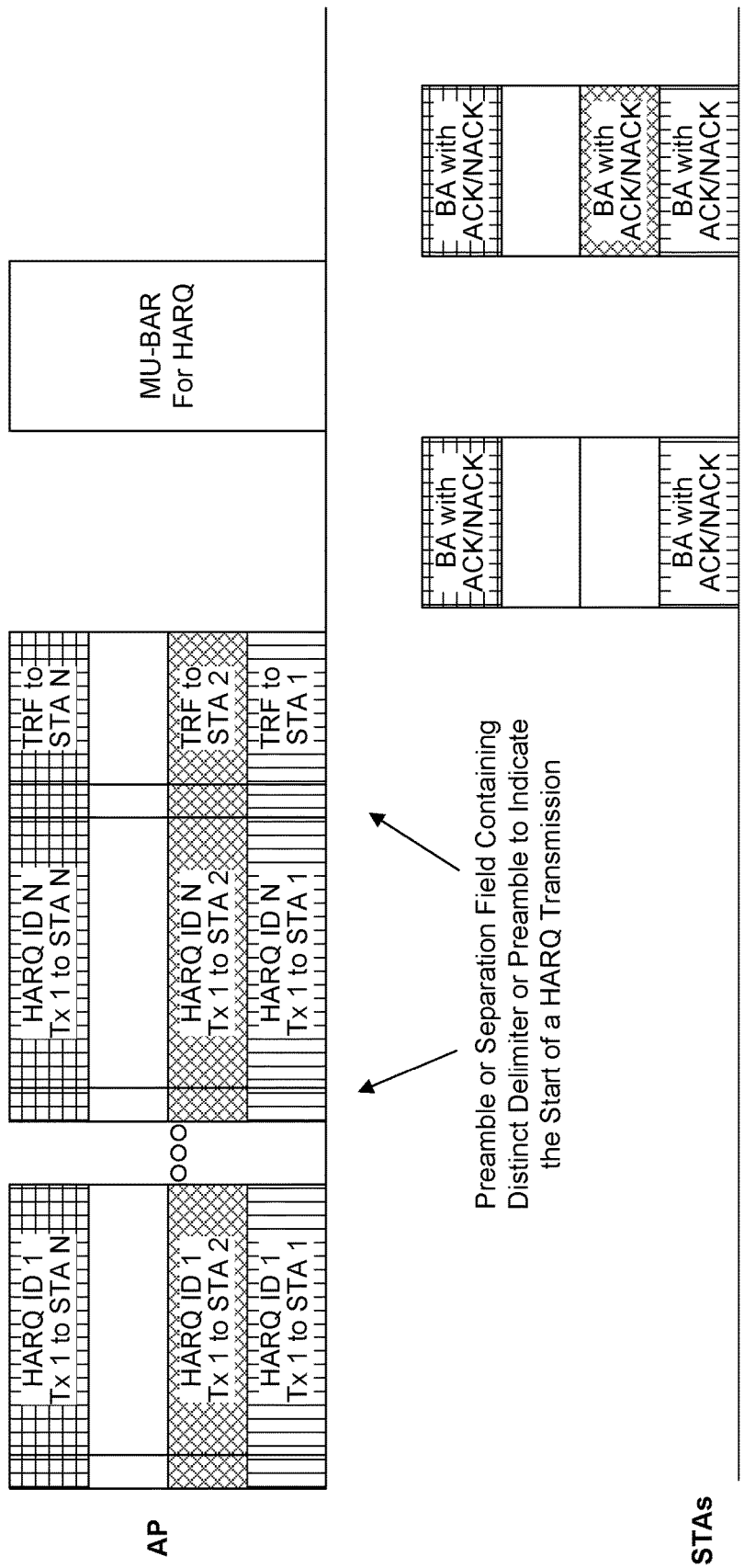
FIG. 13 is a timing diagram showing a DL HARQ Multiple Stop and Wait procedure in accordance with an embodiment.

Method 1:

An example design of a DL HARQ Multiple Stop and Wait procedure is shown in FIG. 13. The procedures for DL HARQ Multiple Stop and Wait procedure may contain the following steps.

An AP and a number of STAs may have exchanged capabilities of their support for multiple Stop and Wait HARQ. They may have exchanged the window sizes or the number for concurrently running HARQ processes. Without loss of generality, it is assumed that the number of concurrent HARQ processes per STA or per STA per TID may be N.

For a STA that has indicated that it supports Multiple Stop and Wait HARQ processes, the AP may conduct HARQ transmissions for multiple HARQ processes for each of the STAs on a particular RU. For example, as shown in FIG. 13, the AP may transmit an A-MPDU or an A-PPDU to STA 1 on RU 0. The A-MPDU or A-PPDU may contain a number of PPDUs or MPDUs that may contain multiple transmissions of multiple HARQ processes. For example, the PPDU or MPDU may contain the first transmission for STA 1 on RU 0 for HARQ Process 1-N. Similarly as in the last section, each of the HARQ transmission may contain or be preceded by a preamble and/or separation field, which may contain a distinct pattern of bits of delimiter, training fields such as LTF, STF, or other type of field to announce the start of a new PPDU, or a new HARQ transmission. The preamble or separation field may also contain information of the upcoming HARQ transmission, such as the HARQ Process ID, the targeting receiving STA, the starting time of the HARQ transmission, the MCS, the RV numbers of the HARQ transmission, retransmission of a previous HARQ transmission, the length of the upcoming HARQ transmission or PPDU, the length or duration of the upcoming HARQ transmission(s) or PPDU(s), as well whether more PPDUs or HARQ transmissions will follow the upcoming HARQ transmission or PPDU.

Similarly, the AP may transmit an A-MPDU or A-PPDU for STA 2 on RU 1, which may contain a mix of HARQ transmissions and non-HARQ transmissions. One or more PPDUs transmitted on RU 1 may contain the first transmission of HARQ process 1-N for STA 2.

In the same A-MPDU or A-PPDU transmitted to a STA on a particular RU, the AP may also include a trigger frame or a Multi-HARQ BAR frame to trigger HARQ responses from the STA. MPDUs such as trigger frame, Multi-HARQ BAR, and other types of frames, such as management or control frames, may be transmitted within one A-MPDU. The A-MPDU may be transmitted in a separate PPDU that is part of the A-PPDU. The PPDU may contain or be preceded by a preamble and/or separation field, which may contain a distinct pattern of bits such as delimiters, training fields such as LTF, STF, or other types of fields to announce the start of a new PPDU, or a new HARQ transmission, as well as other HARQ related information as described above. The PPDUs or MPDUs containing the non-HARQ transmissions may be transmitted first or last in the A-MPDU or A-PPDU, or anywhere there within. Additionally or alternatively, the response to the HARQ transmissions may be triggered or scheduled by response scheduling header of one or more PPDU(s) or MPDUs contained in the same A-MPDU or A-PPDU.

In another implementation, the AP may transmit a Multi-STA Multi-TID Multi-HARQ BAR, or a Multi-STA Multi-HARQ BAR to one or more STAs to solicit responses for one or more HARQ processes that may be associated with one or more TIDs.

The receiving STA may transmit responses a IFS time (such a SIFS, a HIFS, or a HARQ Response time) since the HARQ transmission. Such responses may be triggered or scheduled by trigger frames, Multi-HARQ BARs, or response scheduling headers. The response may be BA with ACK/NACK, Multi-HARQ BA, or Multi-TID Multi-HARQ BA.

After receiving the responses from the STAs, the AP may then decide to conduct further HARQ transmissions. If one or more HARQ processes has been ACKed by a STA, the AP may continue to transmit HARQ transmissions for new HARQ processes, provided the number of concurrent HARQ processes are still less than or equal to the number of concurrent HARQ processes indicated by the STA. If no response has been received or a NACK has been received for a HARQ process, the AP may decide to conduct retransmission or send additional RVs in the follow up HARQ transmissions.

Figure 14:
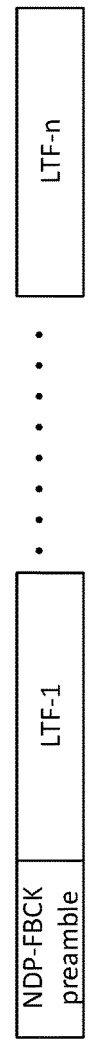
FIG. 14 is a diagram of a HARQ NDP Feedback Frame for multiple HARQ feedback in accordance with an embodiment.

Method 2:

In another embodiment, such as illustrated in FIG. 14, the NDP feedback PPDU may have more than one concatenated LTF to accommodate the large number of HARQ transmissions. The index of LTF and tone set within the LTF may be identified by the header of each PPDU or specified in the TF. Alternatively, the association of time/frequency resource of HARQ TX and feedback resource may be implicit based on a mapping rule.

An MU-BAR soliciting HARQ feedback may be used as a TF for HARQ feedback. The message may contain the ID of a (A-)PPDU and/or the RU, symbol/time index within the (A-)PPDU.

A timer may be negotiated between AP and non-AP STAs to be associated with a HARQ process. The timer starts on a failed HARQ (re)transmission.

When the time expires, the STA may: (1) send a poll to the AP asking for the re-transmission of the HARQ process, and a second timer may be started after the poll. Upon expiration, the STA may declare the failure of the HARQ process, and proceed with the next packet/HARQ Process; and (2) send a BA identifying missing MPDUs and flush the HARQ buffer associated with the process In an embodiment, a STA may not send BA for reporting the successfully received MPDUs for an established BA agreement with HARQ support, unless it receives a BAR to trigger a BA. In other embodiments, it may.

3.3 HARQ UL MAC Procedures

Figure 15:
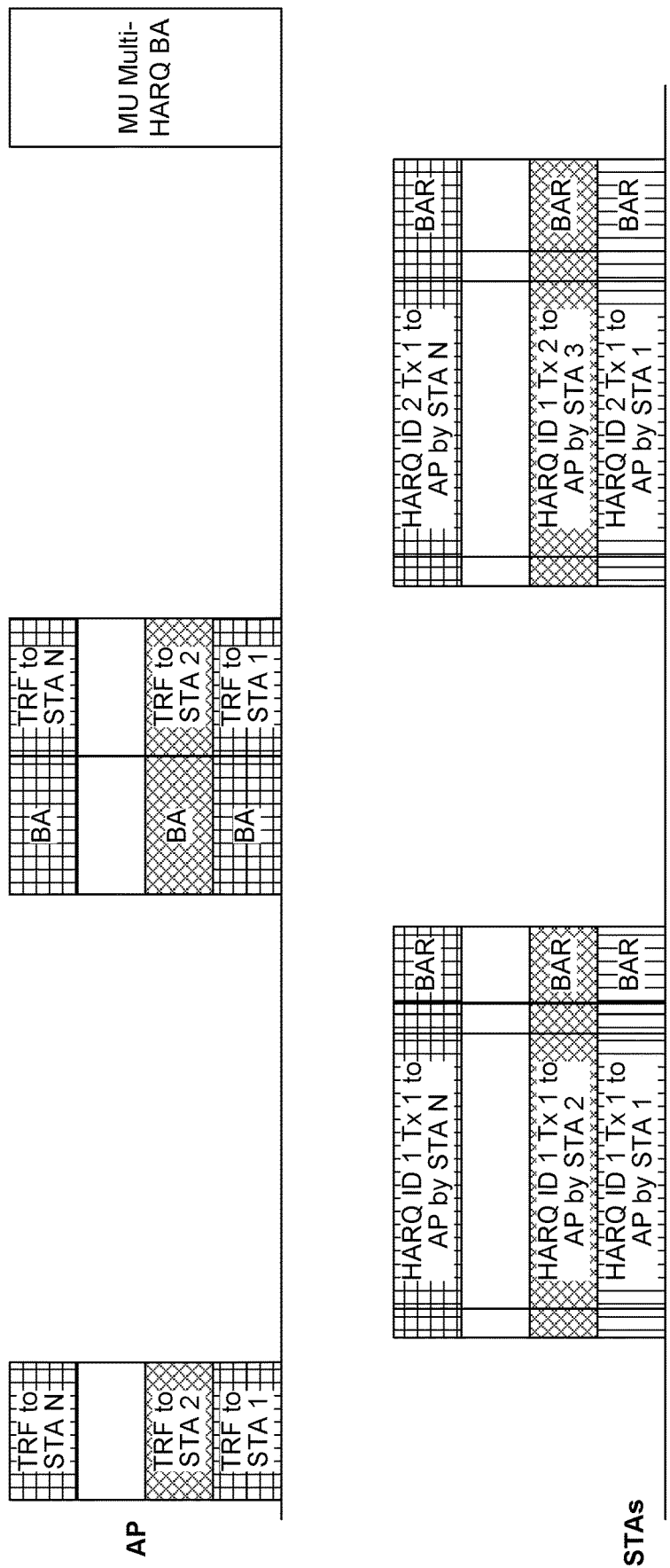
FIG. 15 is a timing diagram showing a HARQ UL procedure in accordance with an embodiment.

An example HARQ uplink procedure is shown in FIG. 15. A HARQ uplink MAC procedure may include one or more of the following steps.

An AP and one or more STAs may have exchanged capabilities of UL HARQ transmissions and/or HARQ receptions, as well as HARQ parameters.

The AP may trigger uplink HARQ transmissions by transmitting a trigger frame for a STA on a particular RU. Additionally or alternatively, the AP may trigger uplink HARQ transmissions from multiple STAs by transmitting a trigger frame for one or more STAs over the entire channel bandwidth. Such a trigger frame may be a HARQ trigger frame. The trigger frame may contain information that specific HARQ transmissions are being triggered. In addition, the trigger frame may also indicate specific information regarding the HARQ transmission being triggered, such as HARQ Process ID, RV number, size of HARQ transmissions, MCS, RU allocations, etc.

A STA may transmit a UL A-MDPU or A-PPDU in response to a trigger frame on a particular RU or over the entire bandwidth. For example, as shown in FIG. 15, STA 1 may transmit a PPDU including HARQ transmission 1 for HARQ process ID 1 to the AP. The PPDU containing the HARQ transmissions may include a preamble and/or separation field, which may contain or be preceded by training fields, delimiters, indicator of HARQ transmissions, and other HARQ transmission related information as described above, including the duration and/or MCS of the expected HARQ transmissions.

If the AP and the STAs have indicated that they support UL Multiple Stop and Wait HARQ process, the STA may transmit a number of HARQ transmissions associated with a number of concurrent HARQ processes, provided that the number of concurrent HARQ processes can be supported by the AP and the STA as indicated by their capabilities exchanges.

The STA may also include a HARQ BAR frame in order to request responses for the HARQ transmissions. Alternatively, the STA may include a NDP packet or a frame with only a MAC header in the A-PPDU or A-MPDU within the MAC header including an indication "immediate ACK" is requested. In another example, the STA may also include a Multi-HARQ BAR or a Multi-TID Multi-HARQ BAR to request responses for multiple HARQ processes associated with one or more TIDs. Similarly as described above, the packets such as BAR, ACK, or other type of management or control frames that are not a part of the HARQ transmissions may be included in one particular A-MPDU carried in one PPDU. The PPDU may also contain or be preceded by a preamble or separation field. This PPDU may also be transmitted as the first PPDU in the A-MPDU or as the last PPDU in the A-MPDU.

The AP may respond to the HARQ transmission and/or BAR frames by transmitting A-MPDUs in the downlink, which may include BA as well as trigger frames. In one example, the trigger frames for a particular HARQ process ID for a particular STA may also serve as NACK for that HARQ process. For a multiple stop and wait HARQ process, the trigger frame may contain a bitmap or a list of HARQ Process IDs for which UL HARQ transmissions may be triggered.

A STA receiving a BA and/or a trigger frame for one or more HARQ process IDs may use the information contained in the BA and/or trigger frame to determine the follow up transmissions and HARQ transmissions. If it has determined that a HARQ process has been successfully decoded and ACKed by the AP, then it may continue to transmit one or more HARQ transmissions associated with one or more new HARQ processes, provided that the number of concurrent HARQ processes with the AP is still less than or equal to the maximum number of concurrent HARQ processes agreed upon by the AP and the STA. Otherwise, it may conduct retransmissions of the HARQ processes that are NACKed or not ACKed. Alternatively, it may decide to transmit different RVs for HARQ processes requested or NACKed or not ACKed.

The AP may also send a Multi-STA Multi-TID Multi-HARQ BA to provide responses to one or more STAs that have transmitted UL transmissions for one or more HARQ processes associated with one or more TIDs.

3.4 HARQ Cascading MAC Procedures

Figure 16:
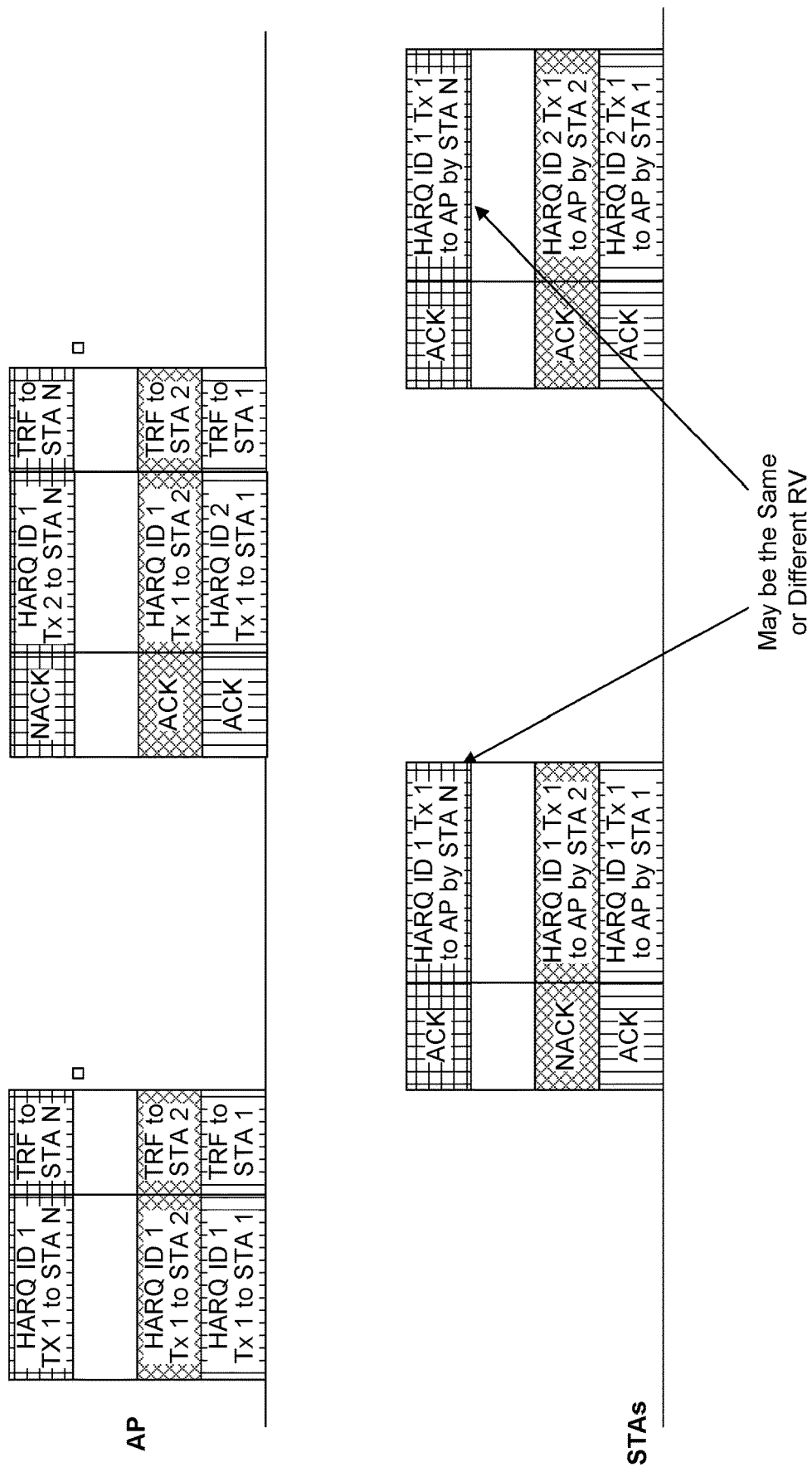
FIG. 16 is a timing diagram showing a HARQ Cascading UL and DL procedure in accordance with an embodiment.

An example HARQ cascading uplink and downlink procedure is shown in FIG. 16. The cascading UL and DL HARQ procedures may include one or more of the following steps.

An AP and one or more STAs may have exchanged capabilities of supporting HARQ, or in particular, supporting cascading HARQ procedures.

The AP may transmit an A-MPDU or A-PPDU to a particular STA on a particular RU or over the channel bandwidth of 20 MHz or more. For example, as shown in FIG. 16, the AP may transmit an A-MPDU or A-PPDU to STA1 on RU 0, which contains a HARQ transmission for HARQ process ID 1, and trigger frames for STAs to transmit responses to the DL HARQ transmissions, as well as transmitting UL transmissions. Before STA 1 has started with UL HARQ processes, the trigger frame may only contain an indication that only HARQ transmissions are allowed or that HARQ and non-HARQ transmissions are allowed. After STA 1 has transmitted one or more UL HARQ transmissions, the trigger frame may also contain specific HARQ processes or retransmissions or a specific RV number of a HARQ process that it desires to trigger in the uplink. Alternatively, the AP may trigger uplink transmissions using response scheduling headers or a trigger frame over the entire channel width that is 20 MHz or wider. The trigger frame may include resource allocation for UL transmissions. The transmission of the trigger frames may depend on the indicated buffer status of the STAs, which may have been obtained from previous NDP Feedback reports or buffer status reports which may be contained in MAC headers.

The DL A-MPDU or A-PPDU may contain an indication of whether additional HARQ processes are pending at the transmitting STAs, for example, by setting the More Data or More Fragment bit in the MAC header in the A-MPDU, or A-PPDU, or in the PPDU which carries the HARQ transmission, or in the PPDU which carries MPDUs that are not part of the HARQ transmission.

A receiving STA of such DL A-MPDU or A-PPDU may transmit an A-MPDU or A-PPDU in the uplink to the AP on the RU that is allocated to it by a trigger frame or response scheduling header in the DL A-MPDU or A-PPDU. The STA may include ACK/NACK/BA/HARQ responses in addition to HARQ transmission 1 associated with HARQ process ID 1 to the AP. The UL A-MPDU or A-PPDU may contain an indication of whether additional HARQ processes are pending at the transmitting STAs, for example, by setting the More Data or More Fragment bit in the MAC header in the A-MPDU, or A-PPDU, or in the PPDU which carries the HARQ transmission, or in the PPDU which carries MPDUs that are not part of the HARQ transmission.

The AP, after receiving the UL A-MPDUs or A-PPDUs, may determine the status of the DL HARQ transmissions, and determine whether it can decode one or more transmissions associated with one or more UL HARQ process IDs. It may then transmit the ACK/NACK/BA/response for the UL HARQ transmissions. It may also decide to transmit trigger frames to trigger additional UL HARQ transmissions depending on the status of the UL HARQ transmissions as well as the buffer status or indication of additional pending HARQ transmissions by the STA in the UL.

The AP may also include additional DL HARQ transmissions to the STA based on the feedback received from the STAs. For example, as shown in FIG. 16, the AP may transmit Transmission 1 associated with HARQ ID 2 to STA 1 and STA 2, on RU 0 and RU 1, respectively, since the HARQ transmission 1 associated with HARQ ID 1 to STA 1 and STA 2 have been ACKed. The AP may transmit Transmission 2 associated with HARQ ID 1 to STA N on RU L since the HARQ processed has been NACKed.

A STA, after receiving a DL A-MPDUs or A-PPDUs from the AP which may contain HARQ transmissions and/or Trigger frames and solicit response frames, may determine the status of the UL HARQ transmissions from itself to the AP, and determine whether it can decode one or more transmissions associated with one or more DL HARQ process IDs transmitted by the AP to itself. It may then transmit the ACK/NACK/BA/response for the DL HARQ transmissions as a part of a UL A-MPDU or A-PPDU. It may also indicate whether it has additional transmission or pending HARQ processed to transmit.

The STA may also include additional UL HARQ transmissions to the AP based on the feedback received from the AP in the DL A-MPDU or A-PPDU. For example, as shown in FIG. 16, STA N may transmit Transmission 1 associated with HARQ ID 1 to the AP on RU L, since the HARQ transmission 1 associated with HARQ ID 1 by STA N has not been ACKed (or has been NACKed). STA 2 and STA 1 may transmit transmission 1 associated with HARQ ID 2 to the AP on RU 0 and RU 1 respectively, since the HARQ processes have been ACKed.

Figure 17:
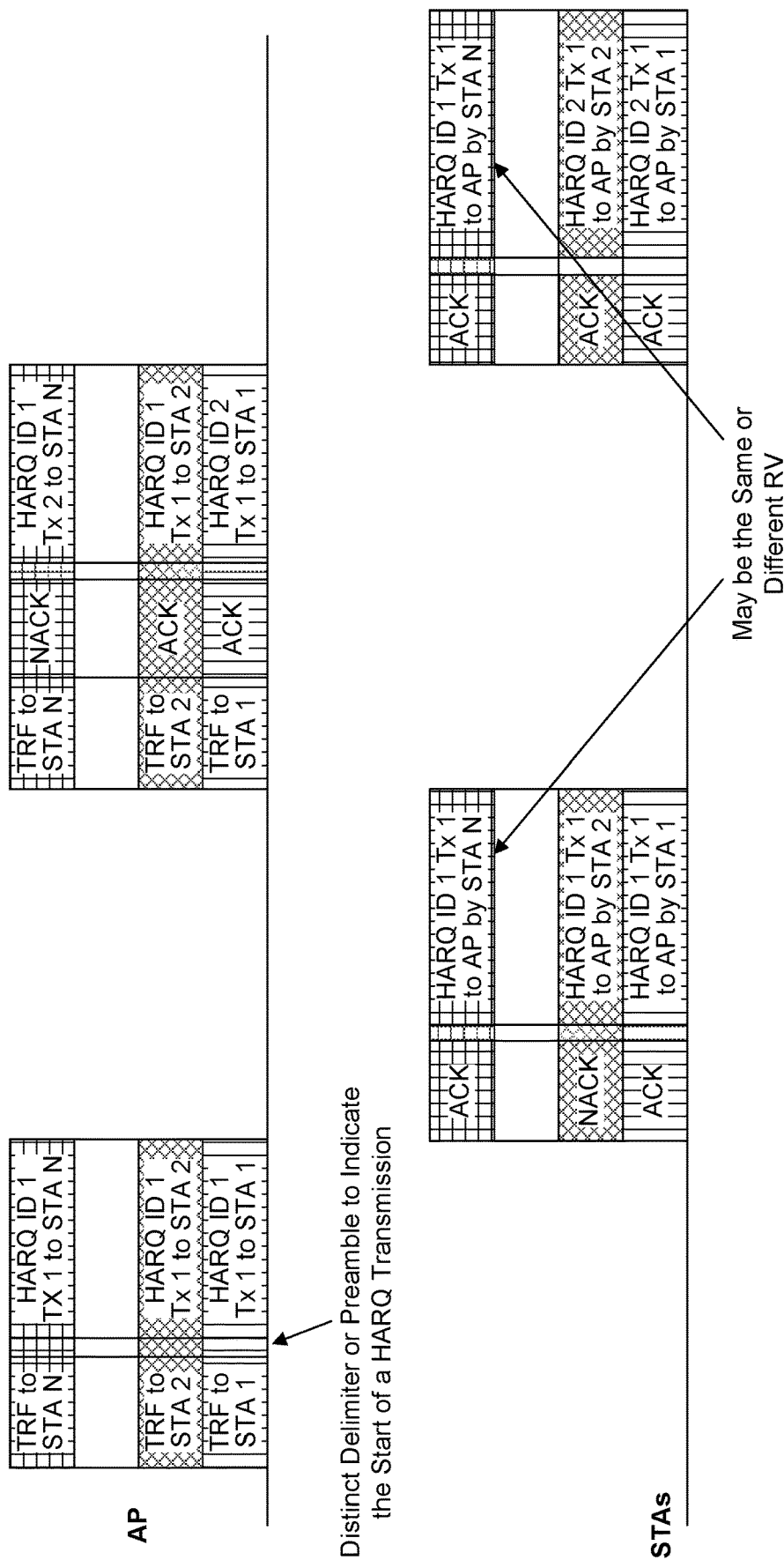
FIG. 17 is a timing diagram showing a HARQ Cascading UL and DL procedure in accordance with another embodiment.

Another example design of the cascading UL and DL HARQ procedures is shown in FIG. 17.

In this embodiment, the AP and the STA may still send an A-MPDU or A-PPDU. The MPDUs such as ACK/NACK/BA, BAR, Trigger frame, other type of management or control frames or other type of frames that are not part of a HARQ transmissions may be grouped together in one A-MPDU, which may be carried in one PPDU. In another embodiment, these MPDUs may be grouped into one or more A-MPDUs, with the A-MPDUs carried in one or more PPDUs.

Each HARQ transmission may be carried in a separate PPDU that may be a part of the A-PPDU transmitted by the AP or the STA. The PPDU may contain or be preceded by a preamble and/or separation field, which may contain a distinct pattern of bits such as delimiters, training fields such as LTF, STF, or other type of fields to announce the start of a new PPDU or a new HARQ transmission. The preamble or separation field may also contain information of the upcoming HARQ transmission, such as the HARQ Process ID, the targeting receiving STA, the starting time of the HARQ transmission, the MCS, RV numbers of the HARQ transmission, retransmission of a previous HARQ transmission, the length of the upcoming HARQ transmission or PPDU, the length or duration of the upcoming HARQ transmission(s) or PPDU(s), as well whether more PPDUs or HARQ transmissions will follow the upcoming HARQ transmission or PPDU.

The PPDU or MPDU containing the non-HARQ transmissions may be transmitted first or last in the A-MPDU or A-PPDU, or in any place there within.

3.5 HARQ MAC Procedures Utilizing TWT or RAW

Figure 18:
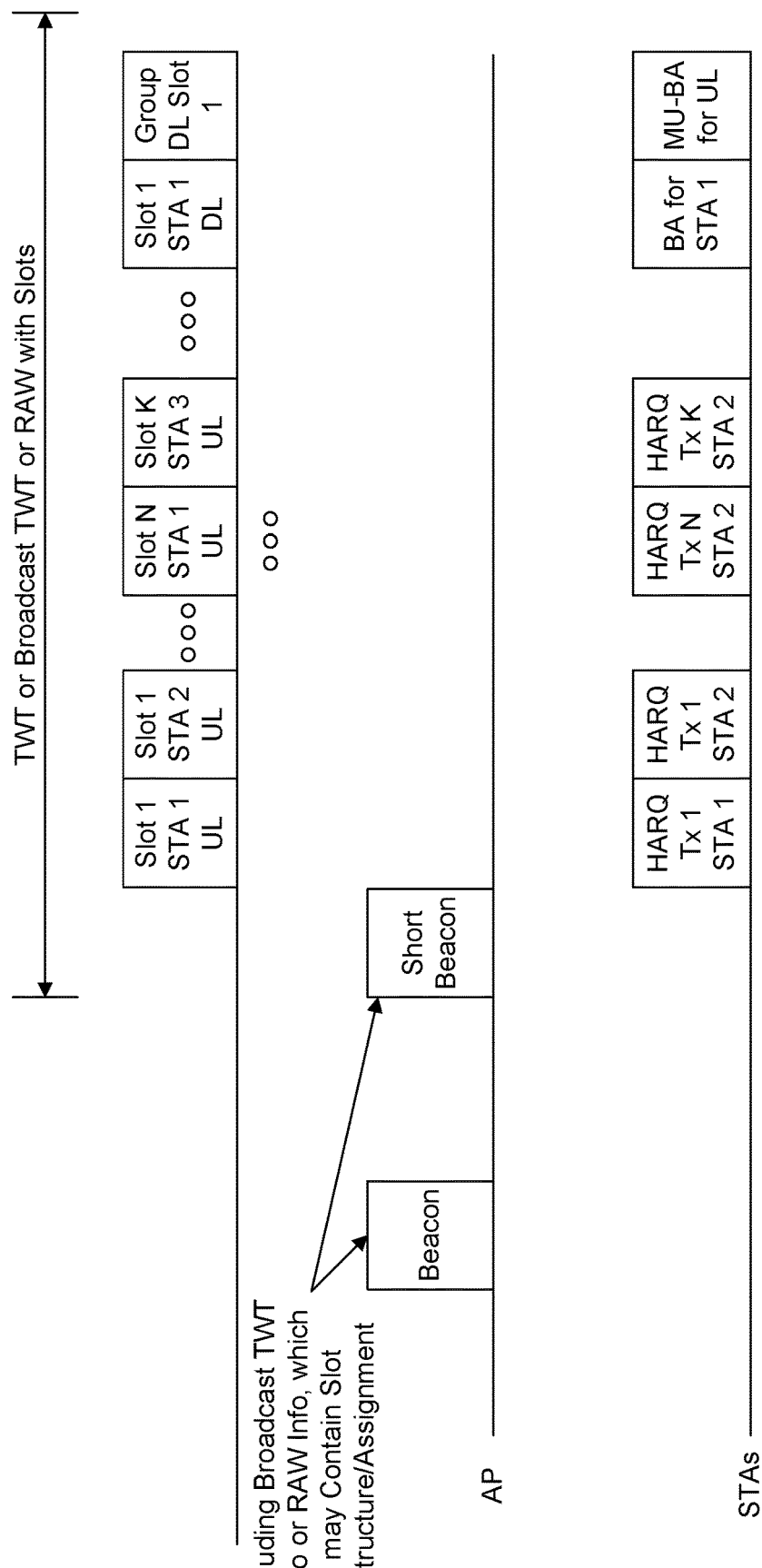
FIG. 18 is a timing diagram showing a HARQ MAC procedure using TXT or RAW in accordance with an embodiment.

STAs may leverage scheduling design such as TWT (Target Wake Time), Broadcast TWT, or Restricted Access Window (RAW) or other type of scheduling design for HARQ MAC procedures. FIG. 18 is a diagram illustrating an exemplary design for HARQ MAC procedure using TWT or RAW.

TWT or RAW may have a slotted structure. Information regarding TWT or RAW or may be included in a beacon, short beacon, FILS discovery frame, or other type of frame.

A STA may determine one or more DL or UL slots based on its own ID or other type of parameters, such as its AIDs, or parameters announced by the AP.

The AP may announce that one or more of the slots are meant for HARQ transmissions.

A STA may determine its UL slots and transmit HARQ transmissions to the AP, and then may determine its DL slots to receive one or more responses on the UL HARQ transmissions.

A STA may also determine its DL slots to receive one or more HARQ transmissions, and then determine one or more UL slots to transmit responses regarding the DL HARQ transmissions.

A DL slot for a group may be used by the AP to transmit group-based HARQ transmissions in the downlink, and/or Multi-STA Multi-TID Multi-HARQ BA, or Multi-STA Multi HARQ BA to provide responses to one or more STAs for one or more HARQ processes associated with one or more TIDs.

3.6 UL HARQ MAC Procedures within a TXOP

In this section, we consider an UL HARQ procedure within a Transmit Opportunity (TXOP). In a TXOP, a STA/AP may acquire the channel and share it with others. Thus, the transmissions are more schedule-based thus the receiver may know which STAs may be the desired transmitter and receiver, and transmission failure may be considered to be due to bad channel or low SNR mainly. APs and STAs may need to exchange capabilities to support HARQ transmissions or HARQ transmissions within a TXOP using management/control frames.

Figure 19:
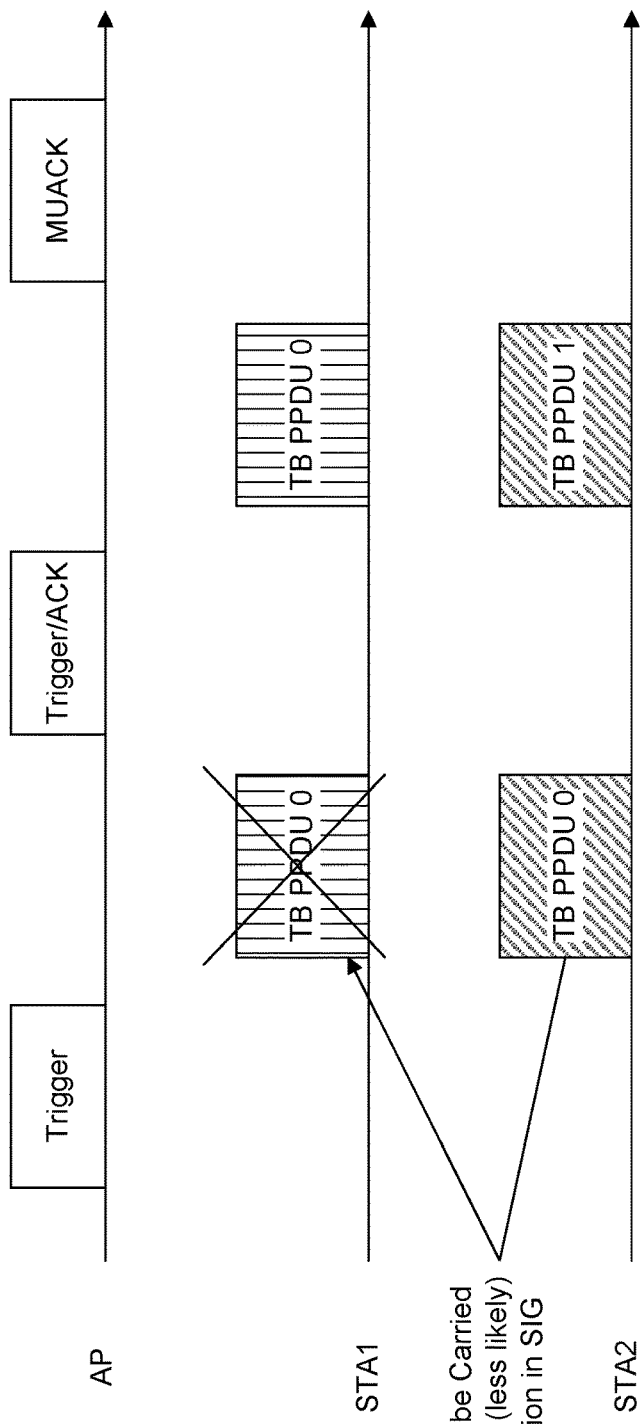
FIG. 19 is a timing diagram showing a single UL HARQ MAC procedure within a TXOP in accordance with an embodiment.

An exemplary procedure is shown in FIG. 19.

The AP may acquire the channel and transmit a Trigger frame/MU Request to Send (RTS) to a group of STAs, including STA1 and STA2. A MU RTS frame may be considered as a special form of a Trigger frame. Thus, mention of Trigger frame in this document implies that it may be a MU RTS frame. Alternatively, the Trigger frame may be used in UL single user transmission. In the Trigger frame, the AP may indicate one or more of the following pieces of information for the upcoming HARQ transmission from the STA(s).

For example, a HARQ Trigger field may indicate that the Trigger frame may be used to trigger HARQ transmissions. In one embodiment, the field may be interpreted as a TXOP HARQ Trigger which may indicate that HARQ procedures may be valid within the TXOP. The AP and STAs may flush the HARQ buffer after the end of the TXOP.

A HARQ process ID field may be used when more than one HARQ process may be allowed. Specifically, the field may be used to indicate the transmissions related to a set of information bits. The retransmission of the same set of information bits may use the same HARQ process ID. Thus, a STA may use the HARQ process ID to identify the related new transmission and retransmissions.

A Redundancy Version field may be used when incremental redundancy is used for upcoming HARQ transmissions. This field may be used to indicate which part of the codeword may be used in the (re)transmission. In one method, this field may be used to indicate a particular puncturing scheme used to generate the codeword of that (re)transmission.

A Retransmission Indication field may be used to indicate if the upcoming transmission is a new transmission or a retransmission. In one embodiment, the Retransmission Indication field may serve as implicit negative acknowledgement transmission, which indicates that the previous transmission may have failed.

A MCS field may be the same or different from new transmission to retransmission(s).

Some of the above mentioned fields may be common for all the users and others may be dedicated for a single user. The common fields may be transmitted to all users in a general user field, e.g., the EHT SIG-A field, while the fields dedicated to a single user may be transmitted in a User Information field, e.g., the EHT SIG-B field.

On reception of the Trigger frame, a STA may detect that it is the desired STA for the UL HARQ transmission. It may transmit a HARQ frame including Physical Layer Convergence Procedure (PLCP) header and MAC body.

In an embodiment of the PLCP header, HARQ related information may not be carried by the trigger-based PPDU since everything is determined by the AP and the AP knows the HARQ parameters.

In another embodiment, HARQ process ID, RV, retransmission indication and/or MCS may be carried by TB PPDU in the user-specific SIG field. This method may be used in the case that HARQ transmission may be initiated and controlled by the STA. In that case, the Trigger frame that triggers the transmission may not contain HARQ related information.

The AP receives the UL TB PPDUs, and may decode it. If the AP successfully decodes the packet, the AP may prepare positive acknowledgement and DL transmission to the STA, if needed. If the AP does not successfully decode the packet, the AP may save the received packet in a HARQ buffer. In one embodiment, the AP may transmit a NAK frame to trigger a retransmission from the STA. In another method, the AP may transmit a Trigger frame to trigger a retransmission, wherein the trigger frame may be an implicit NAK for the previous transmission. In yet another embodiment, the AP may transmit a NAK frame and a trigger frame to the STA.

The STAs may perform the transmissions as indicated by the AP.

With UL HARQ data transmission as described herein, the AP may maintain a HARQ buffer. The buffer may be flushed after the end of the TXOP. This means that the transmissions may be combined for HARQ detection only within the TXOP. In another embodiment of DL HARQ transmission, a STA may maintain a HARQ buffer. The buffer may be flushed after the end of the TXOP. In one method, the HARQ buffer may be automatically flushed without signaling. In another embodiment, the AP/STA may signal the buffer condition explicitly.

For example, for UL data transmission, an AP may include buffer status in the Trigger frame. The AP may indicate to a STA that the buffer is reset/flushed and ready for new HARQ transmission. Alternately, the AP may indicate that the buffer may contain transmissions from one or more previous HARQ procedures, which are ready to combine with the retransmission.

For example, in the reverse case, i.e., for DL data transmission, a STA may include buffer status in the acknowledgement frame. The STA may indicate to an AP that the buffer is reset/flushed and ready for new HARQ transmission. Alternately, the STA may indicate that the buffer may contain one or more transmissions from previous HARQ procedure, which are ready to combine with the retransmission.

3.7 UL HARQ MAC Procedures Across Multiple TXOPs

In this section, we consider an UL HARQ procedure across multiple TXOPs. In one embodiment, the HARQ procedures may occur in one or more TXOPs. The TXOP may include the transmissions protected by RTS/CTS (Request to Send/Clear to Send). In this case, the transmissions are more schedule-based, and thus the receiver may know which STAs are the desired transmitter and receiver, and transmission failure may be assumed to be due to a bad channel or low SNR mainly. In one method, the HARQ procedures may occur in one or more TXOPs or autonomous uplink transmissions. Autonomous uplink transmission may indicate a transmission initiated and determined by a non-AP STA.

APs and STAs may exchange capabilities to support HARQ transmissions or HARQ transmissions within a TXOP using management/control frames.

Figure 20:
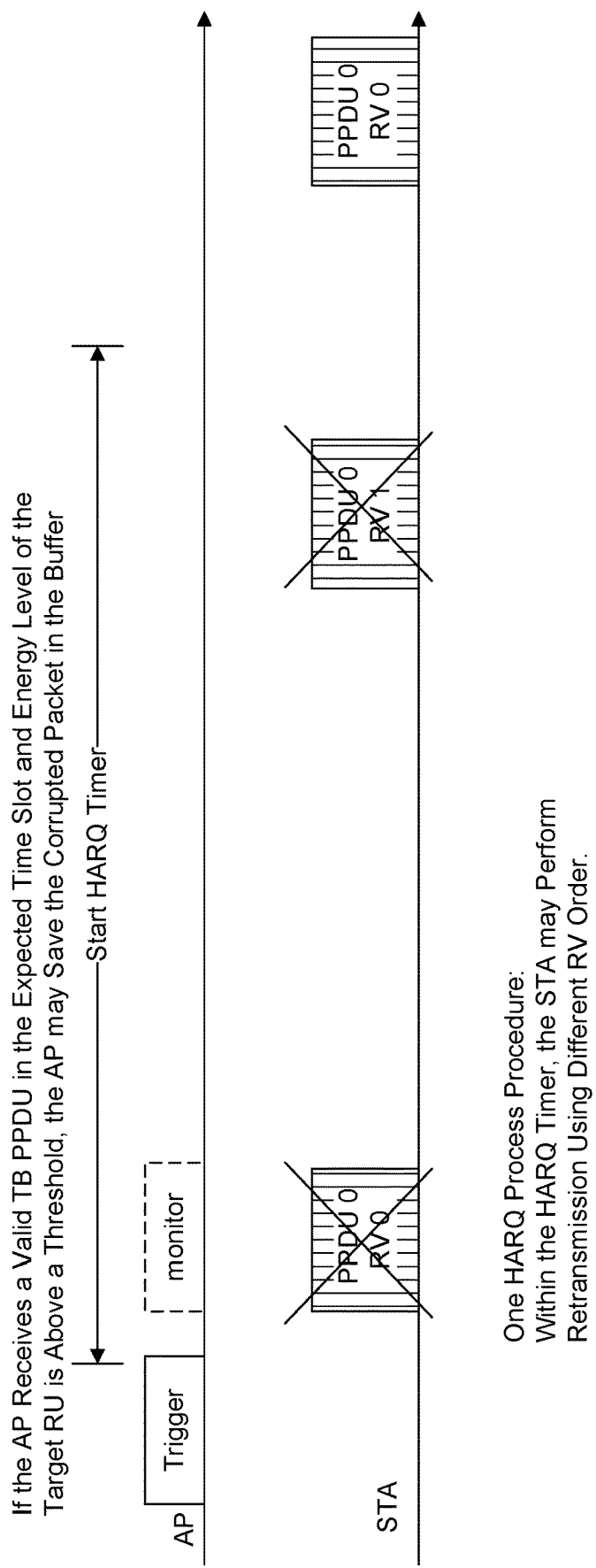
FIG. 20 is a timing diagram showing a UL HARQ procedure for a single HARQ process across multiple TXOPs in accordance with an embodiment.

Since the HARQ procedure may be long, a timer may be provided to indicate the buffer life time. In an embodiment, a HARQ timer may be introduced at the transmitter and/or receiver side, wherein both the transmitter and the receiver know that a packet transmitted before the timer expires may be decoded using HARQ combining. An exemplary procedure is shown in FIG. 20.

The AP may acquire the channel and transmit a Trigger frame/MU RTS to a group of STAs, including STA1 and STA2. A MU RTS frame may be considered as a special form of Trigger frame. Alternatively, the Trigger frame may be used in UL single user transmission too. In the Trigger frame, the AP may indicate one or more of the following pieces of information for the upcoming HARQ transmission from the STA(s).

A HARQ Trigger field may be used to indicate that the Trigger frame is used to trigger HARQ transmissions. In one embodiment, the field may be interpreted as a TXOP HARQ Trigger that indicates that HARQ procedures may be valid across multiple TXOPs. Thus, the AP and STAs should NOT flush HARQ buffer after the end of one TXOP. A Max HARQ buffer duration field may be signaled so that the transmitter and receiver know when the timer has expired such that the HARQ buffer may be flushed. Once the HARQ timer is greater than the Max HARQ buffer duration, the receiver may flush the HARQ buffer. Alternatively, the Max HARQ buffer duration may be predefined/predetermined with no need to signal it. A HARQ timer starting field may be signaled to indicate that the timer may be started. Alternatively, the retransmission indication may be used for this purpose. For example, if the retransmission indication shows that this is a new transmission, the HARQ timer should be started.

A HARQ process ID field may be used when more than one HARQ process is allowed. Specifically, this field may be used to indicate the transmissions related to a set of information bits. The retransmission of the same set of information bits may use the same HARQ process ID. Thus, a STA may use the HARQ process ID to determine which original transmission a retransmission is related to.

A Redundancy Version field may be used when incremental redundancy is used for upcoming HARQ transmissions. This field may be used to indicate which part of the codeword is used in the (re)transmission. In one embodiment, this field may be used to indicate a particular puncturing scheme used to generate the codeword of that (re)transmission.

A Retransmission Indication field may be used to indicate if the upcoming transmission is a new transmission or a retransmission. In one embodiment, the Retransmission Indication field may serve as an implicit negative acknowledgement transmission, which indicates that the previous transmission failed.

A MCS field may indicate the modulation and coding scheme of the transmission. The MCS for the retransmission of a piece of information may be the same or different from the MCS of the original transmission.

Some of the above mentioned fields may be common for all the users and others may be dedicated for a single user.

On reception of the Trigger frame, a STA may detect that it is the desired STA for the UL HARQ transmission. In an embodiment, the STA starts a HARQ timer if the STA notices that the Trigger frame is triggering a new transmission (e.g., by checking the Retransmission Indication field or HARQ timer starting indication field). Otherwise, the STA checks whether the HARQ timer is expired. If the timer has not expired or the STA has started a new timer, the STA prepares a HARQ transmission as indicated by the AP. If, on the other hand, the timer has expired and the AP requests a retransmission, the STA may prepare a new transmission of the packet, and indicate in the PLCP header that it may be a new transmission but not a retransmission.

The STA may transmit a HARQ frame including PLCP header and MAC body. In general, in the PLCP header of the HARQ transmission, the STA may include information such as:

In a first exemplary embodiment, HARQ related information may not be carried in the PLCP header of the PPDU since everything is determined by the AP and the AP knows the HARQ parameters.

In a second exemplary embodiment, HARQ process ID, RV, retransmission indication and/or MCS may be carried by TB PPDU in the user specific SIG field. Note, this embodiment may be used when HARQ transmissions are initiated and controlled by the STA, because, in that case, the Trigger frame from the AP that triggers the transmission may not contain HARQ related information or the HARQ transmission may not be trigger-based.

In an embodiment, the AP receives the UL TB PPDU and checks the PLCP header. If this is a new transmission, the AP starts a HARQ timer. If, on the other hand, this is a retransmission, the AP checks whether the timer has expired. If the timer has not expired, the AP prepares to combine the received packet with the packet(s) saved in the HARQ buffer. If, on the other hand, the timer has expired, the AP does not combine the packet with the packet(s) in the buffer.

The AP then decodes the received packet (or the combination of packets, if the received packet was combined with other packets in the buffer). If the AP successfully decodes the packet, the AP prepares a positive acknowledgement and DL transmission to the STA, if needed.

If, on the other hand, the AP does not successfully decode the packet, the AP saves the received packet in its HARQ buffer if the HARQ timer has not expired. In one embodiment, the AP transmits a NAK frame to trigger a retransmission from the STA. In an alternate embodiment, the AP transmits a Trigger frame to trigger a retransmission, and the Trigger frame serves as an implicit NAK for the previous transmission. In yet another embodiment, the AP may transmit both a NAK frame and a Trigger frame to the STA. In one embodiment, the AP transmits a NAK frame to the STA immediately, but HARQ retransmission may be performed later. In an alternate embodiment, the AP does not transmit any acknowledgement to the STA, and HARQ retransmission is performed later.

The STAs may perform retransmissions as indicated by the AP in the same TXOP or later in another TXOP or autonomously by the STA.

With UL HARQ data transmission as discussed above, the AP and STA each may maintain a HARQ buffer. The buffer may be flushed after the end of the HARQ timer. This means that the transmissions may be combined for HARQ detection only when the timer is valid (not expired). This protocol may also be applied to DL HARQ data transmission. In one embodiment, the HARQ buffer may be automatically flushed without signaling. Alternately, the AP/STA may signal the buffer condition explicitly.

3.8 UL HARQ MAC Procedures Outside a TXOP: UE Autonomous HARQ Transmission

In the case of autonomous UL HARQ performed outside of TXOP, the STA may compete for the resource and send one or more HARQ packets to the AP. This may be an OFDM transmission with the STA acquiring the resource based on Enhanced Distributed Channel Access (EDCA) or may be an OFDMA transmission with the STA acquiring the Resource Unit (RU) based on Uplink OFDMA Random Access (UORA). As the HARQ transmission is autonomously transmitted by the STA, the following processes should be performed.

- As the transmission is not AP originated, the packet for the STA should indicate that this is a HARQ transmission so that the receiver understands that buffer resources need to be reserved for the current transmission as well as possible retransmissions if the decoding fails;
- As the transmission is not AP originated, information on the specific parameters of the current transmission should be included in the autonomous HARQ transmission;
- As the STA is not directed by the AP, information on the buffer status of the AP may be needed at the STA. Such information can be provided by capabilities exchanges with the STA associates with the AP.

The following information may be carried in the autonomous UL HARQ transmission:

- HARQ process ID: this field may be used when more than one HARQ process may be allowed. Specifically, the field may be used to indicate the transmissions related to a set of information bits. The retransmission of the same set of information bits may use the same HARQ process ID. A STA may autonomously decide on the HARQ process ID to use to identify the related new transmission and retransmissions.
- Redundancy version: this field may be used when incremental redundancy is used for the upcoming HARQ transmission. This field may be used to indicate to the AP which part of the codeword is be used in the (re)transmission. In one method, this field may be used to indicate a particular puncturing scheme used to generate the codeword of that (re)transmission.
- Retransmission indication: this field may be used to indicate if the current transmission is a new transmission or a retransmission.
- MCS: modulation and coding scheme field. Original transmissions and retransmissions thereof may have the same or different MCS values.

The parameters above may be derived by the STA from the ACK/NAK information from previous transmissions.

The STA may transmit the HARQ frame including PLCP header and MAC body. In the PLCP header, the HARQ process ID, RV, retransmission indication, and/or MCS may be carried by the TB PPDU in the user specific SIG field.

The AP receives the UL TB PPDUs (for UORA) or UL PPDU (for traditional transmission), and it may decode it.

Note that, as this HARQ transmission is STA originated, there may be scenarios in which the transmission fails due to a collision rather than due to low SNR. Information as to the cause of the failure may be useful to the STA in deciding on the retransmission version (e.g. selection of the RV for retransmission, selection of retransmission resource, selection of CW size etc). As such, the AP feedback may be a NAK, a collision indicator (COL), or a non-reception indicator (NTX). Without loss of generality, for purposes of the following discussion, it will be described as a NAK with the understanding that it may be any one of the signals listed below (with an appropriate STA response listed beside the signal).

| AP FEEDBACK | STA RESPONSE |
| --- | --- |
| NAK | STA performs HARQ retransmissions, keep CW size |
| COL | Change resource, change CW size |
| NTX | Change resource, keep or change CW size |

If the AP successfully decodes the packet, the AP may prepare positive acknowledgement and DL transmission to the STA if needed.

If the AP does not successfully decode the packet, the AP may save the received packet in a HARQ buffer and then transmit an appropriate message to the STA. For example, in one embodiment, the AP may transmit a NAK frame to trigger a retransmission from the STA. In this case, the STA behavior is still autonomous. In another embodiment, the AP may transmit a Trigger frame to trigger a retransmission, wherein the trigger frame may act as an implicit NAK for the previous transmission. In this case, the STA behavior becomes AP directed. In yet another embodiment, the AP may transmit a NAK frame and a trigger frame to the STA. In this case, the STA behavior becomes AP directed.

The STAs may perform the retransmissions as indicated by the AP.

With UL HARQ data transmission as described above, the AP may maintain a HARQ buffer, which needs to be managed. In one embodiment, the HARQ buffer may be automatically flushed without signaling.

Alternately, the AP may signal the buffer condition explicitly. For example, for UL data transmissions, an AP may send a buffer status frame to a single STA or multiple STAs. Alternatively, the buffer status may be sent in the ACK/NAK/COL frame or as part of a Trigger frame. The AP may indicate to a STA that the buffer is reset/flushed and ready for new HARQ transmissions. Alternately or additionally, the AP may indicate to a STA that the buffer contains transmissions from previous HARQ procedures that may be combined with the current transmission in a combined retransmission frame.

Figure 21:
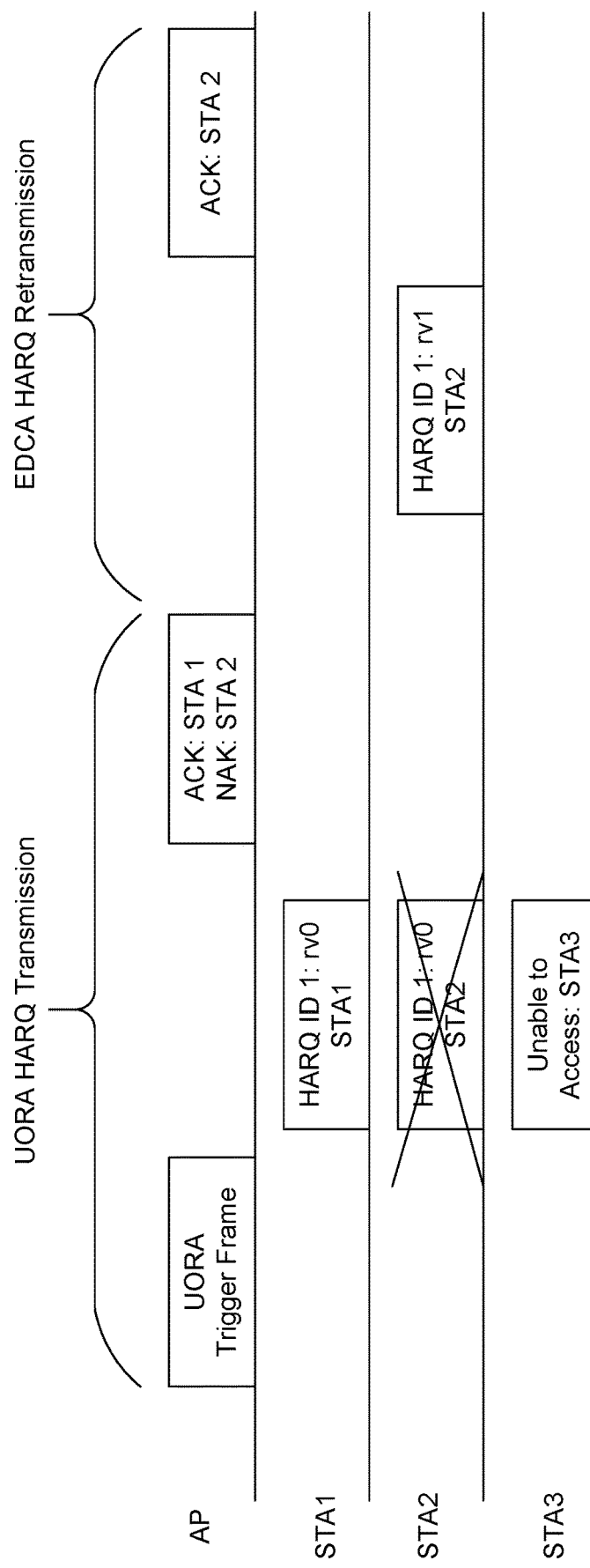
FIG. 21 is a timing diagram showing an autonomous HARQ transmission in accordance with an embodiment.

This procedure is illustrated in FIG. 21.

3.9 FDD HARQ and NDP Feedback for HARQ-Enabled A-PPDU

If Frequency Division Duplex (FDD) is enabled, then APs and STAs may transmit and receive simultaneously on different frequency bands. In FDD mode, the HARQ feedback can be acquired and retransmission can be performed within the same TXOP or in the same (A-)PPDU. Because the STAs receiving in DL band (DL STAs) and the STAs transmitting in UL band (UL STAs) may be different, it is desirable that STAs do not need to decode the PPDU in another direction to acquire HARQ feedback information. In accordance with an exemplary embodiment providing such functionality, a HARQ bi-directional TXOP can be initiated by an AP by sending a Trigger Frame (TF) in the DL channel and/or in the UL channel (for receiver protection at UL and CFO/power/timing correction at UL band). An AP may perform CCA check on both channels before sending a TF.

The set of DL STAs and the set of UL STAs may be different. The set of DL STAs may be indicated in the header of the DL PPDU or the TF. The DL STAs may need to perform sync and CFO correction based on the TF to be able to transmit HARQ feedback for DL reception.

In a HARQ-enabled (A-)PPDU in either UL or DL, LTF may be sent periodically as midambles.

A mid-SIG field may be inserted in the middle of the (A-)PPDU to signal the information needed for the receiver to decode/combine the data.

The location in time of the midamble/LTF and mid-SIG may be different for different users in the same MU/TB-(A-)PPDU, due to different code word size for each user.

The data field may be punctured as NDP feedbacks (i.e., inserting LTF portion of a NDP feedback PPDU).

If punctured, the AP may not use the full set of tone set indices defined for the channel. The unused tone set may be used for data and pilot transmissions.

If punctured, the NDP feedback is not precoded as the neighboring data tones.

If data field is not punctured as HARQ feedback, a separate resource other than data field may be allocated for HARQ feedback.

The TF/(A-)PPDU header/mid-SIG may specify the tone set index for DL/UL HARQ ACK (sent in UL/DL), and the timing (e.g. offset, periodicity) for transmitting/receiving the HARQ ACK/NAK.

Different STAs may be assigned different NDP feedback tone set indices at the same symbol, or a same tone set index at different symbols.

Alternatively, the HARQ feedback timing and tone set index may be implicitly derived from the ID of the RU assigned.

Packet extension field (PE) may also be punctured for NDP feedback symbols.

Figure 22:
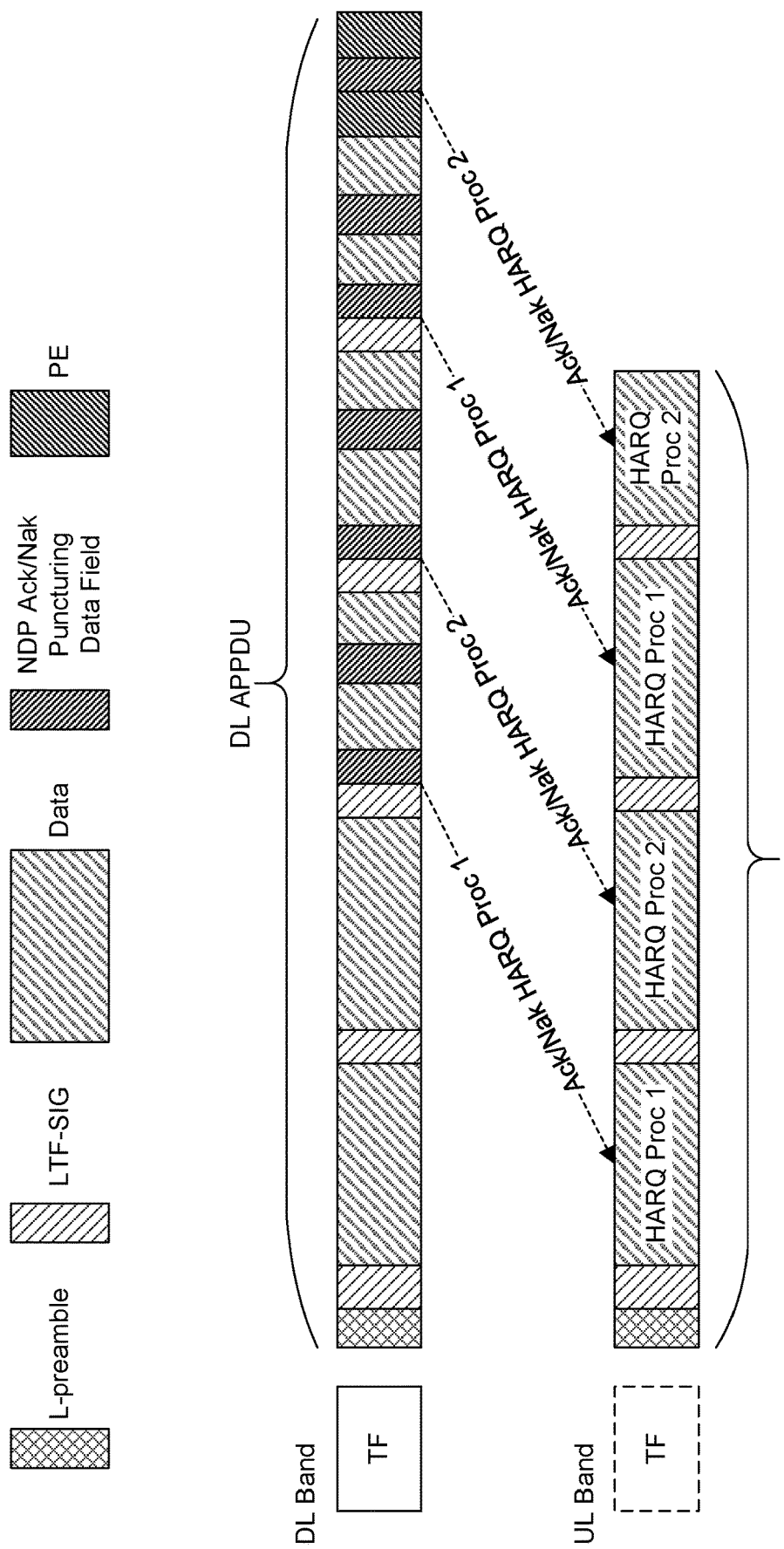
FIG. 22 is a diagram illustrating a punctured LTF for A-PPDU in accordance with an embodiment.

An example of punctured LTF for A-PPDU is shown in FIG. 22.

A NAK in NDP feedback may implicitly grant the same UL resource (as indicated in the TF) for HARQ retransmission. An ACK in NDP feedback may implicitly grant the same UL resource for a new data transmission.

As each NDP feedback tone set uniformly spans most of the 20 MHz channel, and the reception does not require channel estimation, a STA (which may or may not be in direct communication with the AP) may use the NDP feedback to estimate the most suitable RUs (e.g., comparing the power on the on-tones, or the noise on the off tones), and the non-AP STA may report this information to the AP. 'No response' may not be used for HARQ feedback.

The tone set indices assigned for HARQ feedback may change at different symbols/times, such that, by the end of transmission, the HARQ feedback transmitted over the time covers (almost) the entire channel. This may be used as an auxiliary sounding sequence with a granularity requiring interpolation of, at most, 3 tones in the worst case.

The STA observing HARQ feedback as sounding sequence requires a detection of 'on' tones, which has a false detection rate $<10^{-6}$ for SNR$>-24$ dB.

4 Conclusion

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

5 References

[1] IEEE Std 802.11™-2012: Wireless LAN Medium Access Control (MAC) and Physical Layer (PHY) Specifications
[2] IEEE P802.11ac™/D1.0: Part 11, Wireless LAN Medium Access Control (MAC) and Physical Layer (PHY) specifications. Amendment 5: Enhancements for Very High Throughput for Operation in Bands below 6 GHz
[3] IEEE 802.11 af: Part 11, Wireless LAN Medium Access Control (MAC) and Physical Layer (PHY) Specifications, Amendment 5: Television White Spaces (TVWS) Operation
[4] IEEE 802.11 ah-2016: Part 11, Wireless LAN Medium Access Control (MAC) and Physical Layer (PHY) Specifications, Amendment 2: Sub 1 GHz License Exempt Operation
[5] IEEE 802.11-18/1067r2: *EHT TIG Agenda*
[6] IEEE 802.11-18/1180r0: Discussion on EHT Study Group Formation
[7] IEEE P802.11ax™/D3.0, June 2018

What is claimed:
1. A method for hybrid automatic repeat request (HARQ) communications in a station (STA), the method comprising:
receiving, at the STA, a first multi-user (MU) transmission including a first HARQ transmission, a preamble including information indicating that the first MU transmission includes the first HARQ transmission, and a first set of HARQ Process Identifiers (IDs) associated with the first HARQ transmission, the first set of HARQ Process IDs including a first subset of HARQ Process IDs for the STA;
determining, at the STA, a portion of the first HARQ transmission associated with the STA;

transmitting, by the STA, a response message after receiving the first MU transmission, indicating at least a reception status of the portion of the first HARQ transmission at the STA; and receiving, at the STA, a second MU transmission including a second HARQ transmission and a second set of HARQ Process IDs associated with the second HARQ transmission, wherein:

the second HARQ transmission is different from the first HARQ transmission, the second set of HARQ Process IDs includes a second subset of HARQ Process IDs for the STA, and the second subset of HARQ Process IDs is based on at least the reception status of the portion of the first HARQ transmission.

2. The method of claim 1, wherein the response message includes information indicating any of: an ACK, a NACK, No Signal Detected, Interference, a Collision, or Restart HARQ Process Requested.

3. The method of claim 1, wherein the response message includes information for the first subset of HARQ Process IDs.

4. The method of claim 1, wherein the first MU transmission includes a delimiter pattern indicative of a start of the first HARQ transmission.

5. The method of claim 1, wherein the preamble is a preamble of a Physical Layer Convergence Procedure (PLCP) protocol data unit (PPDU).

6. The method of claim 5, wherein the PPDU includes one or more bits for non-HARQ transmission, and wherein the one or more bits for non-HARQ transmission are grouped at a beginning of the PPDU.

7. The method of claim 5, wherein the first MU transmission includes a Trigger frame in the PPDU.

8. The method of claim 7, wherein the Trigger frame includes an indication that it is a Trigger frame for a HARQ process.

9. The method of claim 1, wherein the first and second HARQ transmissions use different redundancy versions.

10. The method of claim 1, wherein the first MU transmission includes a starting HARQ process ID and a bit map indicating the first set of HARQ Process IDs for which HARQ feedback is being requested starting with the starting HARQ process ID.

11. A station (STA) for wireless communications, the STA comprising a processor and a transceiver configured to:

receive a first multi-user (MU) transmission including a first hybrid automatic repeat request (HARQ) transmission, a preamble including information indicating that the first MU transmission includes the first HARQ transmission, and a first set of HARQ Process Identifiers (IDs) associated with the first HARQ transmission, the first set of HARQ Process IDs including a first subset of HARQ Process IDs for the STA;

determine a portion of the first HARQ transmission associated with the STA;

transmit, after receiving the first MU transmission, a response message indicating at least a reception status of the portion of the first HARQ transmission at the STA; and receive a second MU transmission including a second HARQ transmission and a second set of HARQ Process IDs associated with the second HARQ transmission, wherein:

the second HARQ transmission is different from the first HARQ transmission, the second set of HARQ Process IDs includes a second subset of HARQ Process IDs for the STA, and the second subset of HARQ Process IDs is based on at least the reception status of the portion of the first HARQ transmission.

12. The STA of claim 11, wherein the response message includes information indicating any of: an ACK, a NACK, No Signal Detected, Interference, a Collision, or Restart HARQ Process Requested.

13. The STA of claim 11, wherein the response message includes information for the first subset of HARQ Process IDs.

14. The STA of claim 11, wherein the first MU transmission includes a delimiter pattern indicative of a start of the first HARQ transmission.

15. The STA of claim 11, wherein the preamble is a preamble of a Physical Layer Convergence Procedure (PLCP) protocol data unit (PPDU).

16. The STA of claim 15, wherein the PPDU includes one or more bits for non-HARQ transmission, and wherein the one or more bits for non-HARQ transmission are grouped at a beginning of the PPDU.

17. The STA of claim 15, wherein the first MU transmission includes a Trigger frame in the PPDU.

18. The STA of claim 17, wherein the Trigger frame includes an indication that it is a Trigger frame for a HARQ process.

19. The STA of claim 17, wherein the Trigger frame includes a HARQ process ID.

20. The STA of claim 11, wherein the first MU transmission includes a starting HARQ process ID and a bit map indicating the first set of HARQ Process IDs for which HARQ feedback is being requested starting with the starting HARQ process ID.

* * * * *